United States Patent
Cochrane

(10) Patent No.: US 8,116,076 B2
(45) Date of Patent: *Feb. 14, 2012

(54) VIBRATION AND SHOCK CONTROL PROTECTIVE ENCLOSURES FOR HARD DISK DRIVES AND ARRAYS THEREOF

(75) Inventor: Paul Douglas Cochrane, Nepean (CA)

(73) Assignee: Stealthdrive, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/048,778

(22) Filed: Mar. 14, 2008

(65) Prior Publication Data

US 2010/0061051 A1    Mar. 11, 2010

Related U.S. Application Data

(63) Continuation-in-part of application No. 10/593,118, filed as application No. PCT/US2005/009436 on Mar. 21, 2005.

(60) Provisional application No. 60/554,364, filed on Mar. 19, 2004, provisional application No. 60/894,725, filed on Mar. 14, 2007.

(51) Int. Cl.
*H05K 7/12*    (2006.01)

(52) U.S. Cl. ......... 361/679.34; 361/679.33; 361/679.35; 361/679.46; 361/816; 361/818; 312/223.2

(58) Field of Classification Search ......... 361/679.33–679.36, 816, 818, 361/679.46, 688, 693, 692, 800; 174/35 R, 174/35 GC; 312/223.2

See application file for complete search history.

(56) References Cited

U.S. PATENT DOCUMENTS

| | | | | |
|---|---|---|---|---|
| 6,090,728 A * | 7/2000 | Yenni et al. | 442/117 |
| 6,249,432 B1 * | 6/2001 | Gamble et al. | 361/679.35 |
| 6,325,353 B1 * | 12/2001 | Jiang | 248/682 |
| 6,483,023 B1 * | 11/2002 | Jacques | 174/358 |
| 6,580,604 B1 * | 6/2003 | McAnally et al. | 361/679.4 |
| 6,621,717 B2 * | 9/2003 | Tuttle et al. | 361/818 |
| 7,042,737 B1 * | 5/2006 | Woolsey et al. | 361/799 |
| 7,372,706 B2 * | 5/2008 | Bell et al. | 361/799 |
| 2004/0120107 A1 * | 6/2004 | Davis et al. | 361/683 |
| 2007/0171568 A1 * | 7/2007 | Boss et al. | 360/97.02 |

* cited by examiner

*Primary Examiner* — Jayprakash N Gandhi
*Assistant Examiner* — Ingrid Wright
(74) *Attorney, Agent, or Firm* — David B. Dort; Stealthdrive, Inc.

(57) ABSTRACT

The present invention includes several hard disk drive (HDD) enclosures that use pre-stressed polymer compression members to provide integral vibration shock and acoustic noise dampening and isolation. The vibration dampening system has springs of polymeric material located between outer surfaces and existing HDD FRU mounting walls. The suspension system secures the hard drive in a slot in the structure within the polymer springs, isolating the hard drive from the side panels and dampening the vibration internal and external. The minimal structure allows for significant air flow to provide the cooling Beams are designed to consider temperature effects, creep and long term fatigue of the plastics. Multiple beams will be recruited to support the drives and each other to ensure that no individual beam sustains a substantial portion of the load.

9 Claims, 25 Drawing Sheets

Section A-A
(~30° rotation)

VIBRATION AND SHOCK CONTROL PROTECTIVE ENCLOSURES FOR HARD DISK DRIVES AND ARRAYS THEREOF

REFERENCE TO PRIORITY DOCUMENTS

This Application, claims priority under 35 USC §120 to, and is a continuation-in-part of, U.S. application Ser. No. 10/593,118, filed Sep. 18, 2006, which is a national entry of PCT Application Serial No. PCT/US05/09436, filed Mar. 21, 2005, which claims priority to U.S. Provisional Application Ser. No. 60/554,364, entitled HARD DRIVE HAVEN, filed Mar. 19, 2004.

This Application also claims priority under 35 USC §119(e) to U.S. Provisional Application Ser. No. 60/894,725, filed Mar. 14, 2007 entitled VIBRATION AND SHOCK DAMPENING USING POLYMER SPRINGS, by Paul Douglas Cochrane, which is also incorporated by reference for all purposes.

BACKGROUND

During operation, Hard Disk Drives ("HDDs") generate and create vibration as they rotate. By definition, a hard drive system will undergo rotational vibration when an oscillating moment is applied. When a hard disk drive is idle, the oscillation can be caused by friction in the spindle bearings or by rotational imbalance of the platter(s). When the drive is under "read/write" or "seek" conditions, inertia forces from activity of the actuator arm can cause rotational vibration (RV). This rotational vibration is characterized by "rad/s," which is the rotational analog of linear acceleration m/s2 or g. When HDDs are packaged in close proximity, they can, and most often will, propagate RV from one drive to another, degrading drive performance. The vibration can become excessive, particularly when adjacent HDDs are operated simultaneously. Moreover, as HDD technology progresses to faster rotational speeds and cost-reduction architectures, the vibration problems are exacerbated.

In addition to the drive-to-drive induced vibration, there is also the above-discussed possibility of vibration being induced by the environment in which the drives are located. An example of this would be in a "data closet," where network storage equipment is maintained; there could be a number of external sources that can induce vibration. An air conditioner in any relatively near location would be a good example.

Vibration can also come in the form of acoustic vibration; the HDDs can produce disturbing acoustic noise, particularly for the consumer product applications. As personal computers become more prevalent in the home and HDDs are being used for audio/video and entertainment applications, acoustic noise emissions are becoming important to consumers. Another factor in determining performance is acoustic noise by the HDD. For example, research has found that the leading question by consumers with respect to hard drives was, "How loud will this drive be in my system?" In analyzing the answer, the acoustic noise comes generally comes from two sources.

Excessive vibration may lead to decreased HDD performance such as recoverable and non-recoverable write inhibits, increased seek times, and increased read and write access times. Excessive vibration or shock may also cause premature HDD failures that are not repairable. Examples include mechanically-damaged platters and read/write heads, mechanical wear on moving HDD components, and data error defects that cannot be corrected through the use of software tools. Also if there are a large number of HDDs in a confined space, it may result in a substantial amount of heat generation. This heat must be dissipated in order to avoid overheating the HDDs and causing shortened product life.

Disk drives are complex electro-mechanical devices that can suffer performance degradation or failures due to a single event or a combination of events occurring over time. Environmental conditions that affect drive reliability include: ambient temperature, cooling air flow rate, voltage, duty cycle, shock/vibration, and relative humidity. Fortunately, it is possible to predict certain types of failures by measuring environmental conditions.

One of the worst enemies of hard disk drives is heat. Within a drive, the reliability of both the electronics and the mechanics (such as the spindle motor and actuator bearings) degrades as temperature rises. Running any disk drive at extreme temperatures for long periods of time is detrimental and can eventually lead to permanent data loss.

Currently, there is a void in the market as far as a "complete solution" that addresses vibration, thermal, and all other physical issues (mass, structure . . . ) for hard drives. The proliferation of hard drives is growing rapidly. One source estimates that the typical CAGR (compound annual growth rate) for the various segments of the Storage Area Network (SAN) and Network Attached Storage (NAS) arenas are growing at a .about.67% rate (typical). An increase in HDD performance will have a significant effect when considering the tremendous numbers of drives in operation. Much of the HDD industry continues to ignore the threat of damaging vibration as failure rates become exceedingly high. In some manner, the nature to solving many of these problems is the need to resolve "opposing constraints." The constraints invariably pull many of the possible solutions in different directions. Almost without fail, all solutions find that in improving one problem constraint, they diminish the solution from the aspect of one, or more, of the other imposed constraints. The reality has become making trade-offs and finding a "balance" of the capabilities needed to satisfy the need(s).

In view of the foregoing disadvantages in the known types of HDD storage systems, the present invention provides a new solution wherein the same can be utilized for the storage of multiple hard drives or arrays of hard drives.

SUMMARY

There have been many improvements in hard disk drive technology. For example, with the advent and implementation of fluid dynamic bearings, which provide a greater level of vibration and acoustic noise dampening than the traditional ball bearings. The acoustic noise reduction realized in the order of 50%. FDB also provide better non-operational shock isolation, which is important for the mobile applications. In additional there is an every increasing presences of active RIV feedback control systems within HDDs. Even the cost-effective SATA technology, which is taking its place as the dominant HDD technology when considering value and total drive shipments, the STA HDDs currently only provide approximately 5 rad/s.sup.2, of anti-RIV protection. This will most likely increase by a factor 3 or more in the foreseeable future. A few points that make the case for fabricating the drive body from molded plastic are:

Producing the hard drive body from injection molded plastics provide for a faster cycle times and less post machining processes than of cast aluminum. With very tight margins on the selling prices of HDDs, in an ever-expanding market, this point will continue be an increasingly important aspect of implementing various embodiments of the invention.

By fabricating the hard drive body from polymers, there is opportunity to provide further vibration and acoustic noise dampening as well as increased shock isolation.

Polymers can provide enhanced resistance to rotation interference vibration.

The injection molding solution provides an approximately 50 percent reduction in HDD body mass.

Other technologies provide assistance to HDD performance.

In a first embodiment, the Hard Drive Haven is a unit for storing at least one hard disk drive, including: two side panels mounted in parallel with each other, such that both sides of said at least one hard disk drive is in contact with a suspension system, and further includes a set of slots for the plurality of hard drives, which are separated by dividers each, and in which each of the dividers define an upper and lower surface, and the number of slots corresponds to the number of disk drives. The suspension system includes a polymer compression member which is incorporated into each of the dividers; and each of the polymer compression members contacts each of said disk drives at said upper and lower surfaces.

In a second embodiment, the invention includes an enclosure for a hard disk drive, which includes a front portion made of one or more polymers; and the front portion includes five sides and an open end, wherein a front wall of the front portion includes ventilation structures extending into the interior of the front portion; The second embodiment includes a body portion; and the body portion is made of a polymer and has five sides extending from an open side of the front portion and having, and including an interior space accessible from said open side being for storage of a hard disk drive, the body portion configured such that a pair of opposite sides in the body portion include a set of horizontal pre-stressed polymer springs, extending outward from said body portion, and a set of pre-stressed vertical compression members extending upward from said pair of opposite sides, and providing compression in a direction perpendicular to said polymer springs, when said vertical compression members contact a horizontal structure.

In a third embodiment, the invention includes an enclosure that includes a front portion, said front portion made of at least one polymer, and having five sides, including a set of ventilation structures formed into a front side of said front portion and providing volumetric access to an interior of said front portion; the third embodiment also includes a body made of a polymer, said body including four exterior sides and a hollow interior, wherein said body has a set of membrane springs formed along at least two sides of said body, The body is connected to said front portion, such that said hollow portion of said body is volumetrically connected to said open side of said front portion.

FEATURES: The present invention provides the disk drive industry with an improved hard drive storage system that has many of the advantages of the HDH™ mentioned above, but also include the following features:

The configuration of the polymer side walls and face plates allows the air flow passages to be optimized, and provides an excellent thermal environment. The multiple-axis pre-stressed polymer forces reduce vibration (external and drive to drive, RV), shock, and acoustic noise. The single piece plastic-molded snap-fit sidewalls and faceplate allows for the ease of distribution and replacement for hard drives in the field (shipped in original packaging) is structurally sound and minimizes mass; as well as:

provides electrostatic discharge and electrical grounding isolation for the HDDs;

allows for highly reliable interconnect without the need for any mechanical alignment features;

low cost overall solution for the packaging of hard drives; includes a complete snap-fit assembly;

manage polymers in a vibration dampening environment that has exceptional durability. This is done by using a variety of beam elements that work in unison to off-load and not allow the over-stressing of any other beams in the structure;

provides a common platform for the mounting of hard drives in order to provide a predictable, benign and fully optimized solution that promotes long-term reliable hard drive performance;

standardizes this platform in order to better compile consistent data of hard drive performance to continue to drive the technology to greater levels of capacity and performance;

provides the first complete solution for hard drives, from the manufacturing to the end of the life of each individual hard drive.

The invention provides for low cost manufacturing and low production cost and other advantages. Initial tooling cost has been calculated to be a one day payback for a one-time low-cost tool based on extreme market demand and the piece part cost would be exceptionally low as compared to most existing alternatives—injection molding process is the most likely, but not the only possibility. Other advantages include:

Particular embodiments include a minimal part count, light weight and application flexible.

The invention allows for an optimal thermal environment due to the minimal structure, which allowing maximum cross section for cooling air flow.

The invention provides vibration & shock isolation and dampening through the use of pre-stressed polymer members.

Particular embodiments of the invention require minimal packaging complexity allowing for maximum hard drive density.

Particular embodiments provide acoustic noise reduction.

The invention has high mechanical integrity and structural stability and efficiency;

The strong, lightweight, (and optionally) snap-fit polymer members in most of the embodiments provide mass efficiency which is important in that HDDs are massive and the loads on data-com equipment racks will go up sharply with densely packaged hard drives, particularly if the packaging weight is not minimized The invention allows for reliable interconnect (Hot Plug) through the intelligent use of forces to create simple, highly reliable connector alignment, with no mechanical piece parts;

Particular embodiment of the invention allow for improvements in electrostatic discharge control.

The present invention assists in ground isolation, by providing advance pins on hot plugs that handle the discharge of any discharge.

The invention provides for simple field replacement ability and may even allow for the shipping hard drives in OEM packaging for direct installation in the SAN and NAS, as well as allows for Simple Field Serviceability—Drive Level Replacement (with no additional replacement components)

The industrial design is facilitated by existing faceplate design and snap fit features for assembly into the various embodiments of the invention.

BRIEF DESCRIPTION OF THE DRAWINGS

The features and attendant advantages of the present invention will become fully appreciated as the same becomes better understood when considered in conjunction with the accompanying drawings, in which like reference characters designate the same or similar parts throughout several views. Please note that the drawings shown here are of the least complex "beam" structures, as the illustration demonstrates the principle, most clearly.

DETAILED DESCRIPTION

Figure 1A:
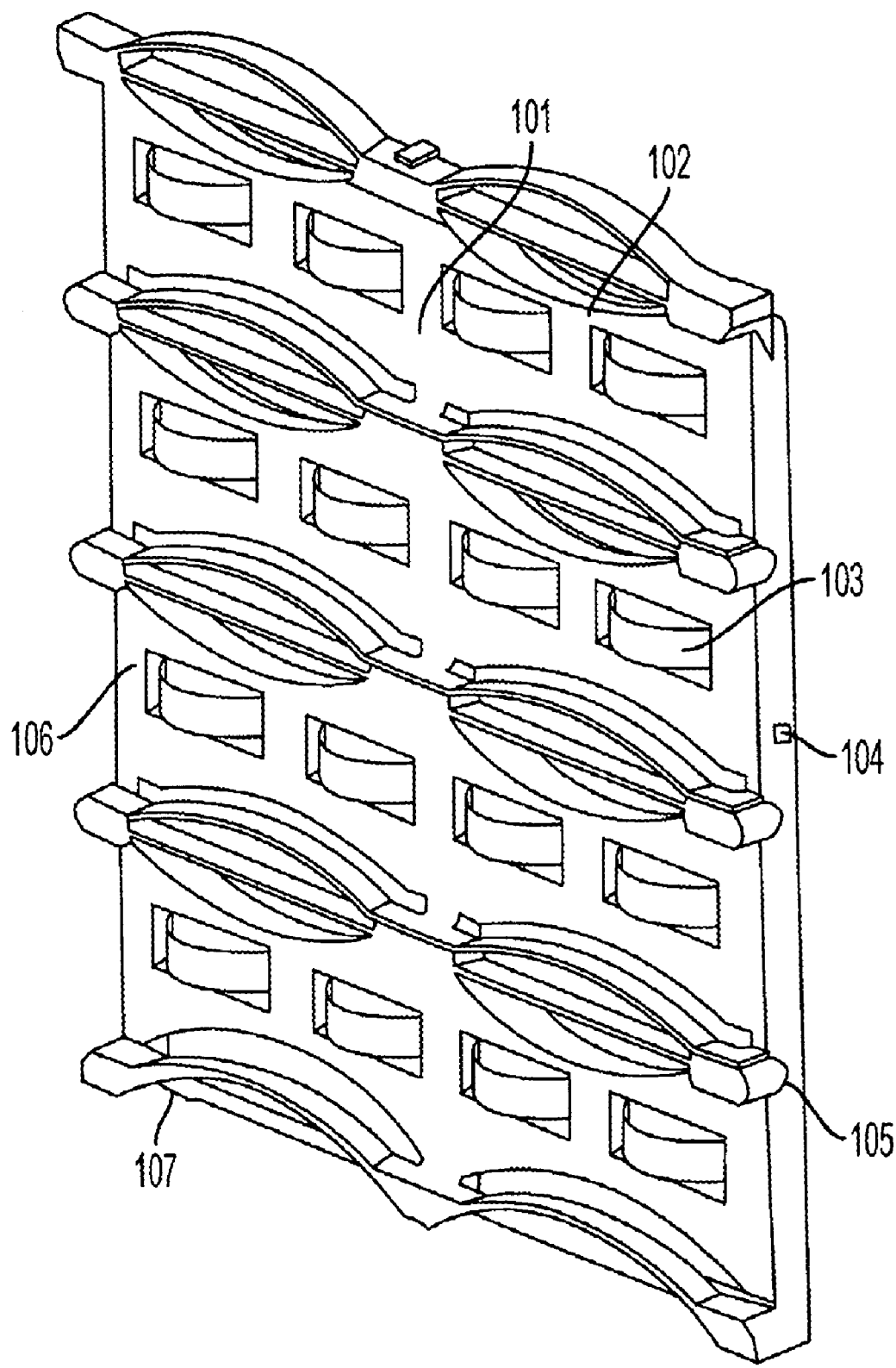
FIG. 1A is a perspective view of a first embodiment of a hard drive storage system implementing polymer compression members.

The present invention takes advantage of the properties of carefully selected dampening materials by taking advantage of being able to configure molded plastics into pre-stressed polymer springs, by considering the various aspect of the polymer science (for example, see Appendix A), making the invention (known by the tradename, the "Hard Drive Haven"™) an excellent vibration-reduced (as well as shock tolerant) HDD environment. The Hard Drive Haven™ and its related progeny as embodied by the retro-fit (Stealthdrive® 2) and alternate (Stealthdrive® III) enclosures, provides an optimum HDD packaging for long-term and reliable operation. As can be appreciated by those skilled in the art, the proper composition and configuration of materials used in the Hard Drive Haven™ is determined through analysis and resolution of vibration and resultant noise in the hard disk drives. Such analysis requires advanced techniques in modeling, analysis and testing, as well as consideration in the relevant materials technologies.

In a first embodiment, the vibration-reduction system is made of polymer, in which pre-stressed "polymer springs" serve as a dampening device to minimize vibration from one hard disk to another, and from outside sources as well, but also allows for thermal advantages because of the reduced-space or "footprint" solution of the storage. The volume of material required for hard disk storage diminishes as more open air maximizes air flow volume for cooling the HDDs.

Particular embodiments of the present invention includes a packaging solution for hard disk drives that is a comprehensive embodiment promoting long term, reliable hard disk drive performance. The present invention not only completely addresses hard disk drive packaging requirements, but in particular embodiments provide a highly cost effective solution to the packaging and manufacture of hard disk drives in multiple markets. The solution provided by particular embodiments of the invention can be implemented for any number of hard drives, individually, or in any multi-disk configuration. The hard disk drives (HDD) are mounted in various embodiments of the Hard Drive Haven™ in a wide range of devices and physical locations from personal computers to Storage Area Networks (SAN) to Network Attached Storage (NAS) appliances, such as Redundant Array of Inexpensive Disks (RAID) arrays, Just a Box of Disks (JBODs), servers and a host of bulk data memory devices. An HDD bay or chassis are located either within a system enclosure in a personal computer, in a JBOD, or in any other location where the HDH™ could be easily installed.

Many embodiments of present invention is generally applicable to hard disk drives in its preferred embodiments and more specifically it relates to an all encompassing solution for the storage of hard drives in a single or multi-hard drive environment. Although the invention was primarily envisioned for use with hard disk drives, the inventive concepts disclosed herein extend into many other industrial, commercial and personal applications in other alternate embodiments, without departing from the spirit and scope of the invention.

The present invention addresses many of the constraints involved in the packaging of HDDs, while simultaneously improving many performance indicators. The Haven offers a complete benign environment for a hard drive.

The following list articulates a number of attributes, inter alia, that describe some of the features and advantages of certain embodiments of the invention as embodied in the various embodiments of the hard drive enclosures. All of the attributes listed apply to the performance, handling, distribution and long-term reliability of hard drives. However, the list would be a very appealing list to many other applications for which the HDH™ could be easily adapted.

There are a great range of beam cross sections and combinations that are under analysis and being shaped to optimize the Haven's performance. In later pages, there will be drawings of a number of beam shapes and combinations rendered in order to demonstrate a small sample of the wide range of form factors that could and will be used to satisfy the needs of hard drives and other devices needing an environmental Haven. Some of the principles for polymer spring compression are included herein in Appendix A as POLYMER BENDING CALCULATIONS (for sample input for finite element analysis). These are exemplary calculations for, primarily, cantilever polymer springs, but the principles may also be applied to other types of polymer springs were appropriate.

Turning now descriptively to the drawings, in which like reference characters generally denote similar elements throughout the several views, the attached, figures illustrate a hard drive mounting structure which is comprised of a polymer and which will be discussed more fully below In the following disclosure, the preferred embodiment of the present invention will be referred to by one of its trade names, the "Hard Drive Haven"™. The Hard Drive Haven™ has a vibration attenuating system that will dampen vibration to and from other co-located hard drives and/or from external vibrational excitations from the local environment. The vibration that is created from other hard drives is referred to as RV, which stands for Rotational Vibration. Hard drives have rotating platters and this rotational energy can be transmitted from one hard drive to another and cause the receiving drive to experience a drop in performance. Embodiments of the invention will utilize a very carefully structured series of beams or springs that will combine in dampening out vibration and acoustic noise over a wide range of frequencies and energy levels. The vibration dampening features will be molded from the structure will also serve both as the support structure for the hard drives and as a stiffening system for the computer, server, storage array, digital recorder, desktop hard drive enclosure as well as for many other possible applications. The focus herein is on hard drives but the application of this solution is extendable to any number of devices that are benefited by having vibration, shock and acoustic vibration dampened from their operating environment.

The present invention takes advantage of the fact that many polymer composites have been found to have excellent dampening properties that can be used to help control any unwanted vibrations produced by external dynamic loading. Moreover, the great flexibility available in composite structures through changing both materials and designs can be used to alter dampening and resonance properties in desirable ways. Documents enclosed herein have materials regarding these composites.

Examples of appropriate polymers for computer applications include: Delrin, Celanese, and Celstran. There are many polymers that offer the properties that will be required for the Hard Drive Haven™ and related hard drive enclosure embodiments. Ultem, Valox and Noryl are three such polymers. Careful analysis, including finite element modeling will be necessary to ensure that the polymer(s) used can withstand the test of time and not yield as a result of creep and/or fatigue. In order to facilitate implementation of many possible embodiments of the invention, references relating to the properties of polymers are incorporated herein. These publications include The Handbook of Materials Science (McGraw-Hill), and the series by Bill Fry, published by the Society of Manufacturing Engineers, entitled Speaking of Plastics Manufacturing (1999). However, representative materials included in table A below are specifically incorporated by reference.

The illustrations included herein reflect only a few of the possible beam structures that can be employed by the various embodiments of the invention. When no beam being stressed and none are strained past the limits of the material used, the HDH™ prevails for the life of the product. In a first embodiment, the inventive suspension system holds the hard drive in a slot in the housing with the polymer springs. The polymer springs isolate the hard drive from the side panels and dampens the vibration produced by the hard drive itself as well as the vibrations transmitted through the sidewalls of the hard drive bay housing. The springs provide constraint and dampening in an omni-directional manner, negating the adverse effects of vibration and acoustic noise from any conceivable source within the operating environment.

Figure 3:
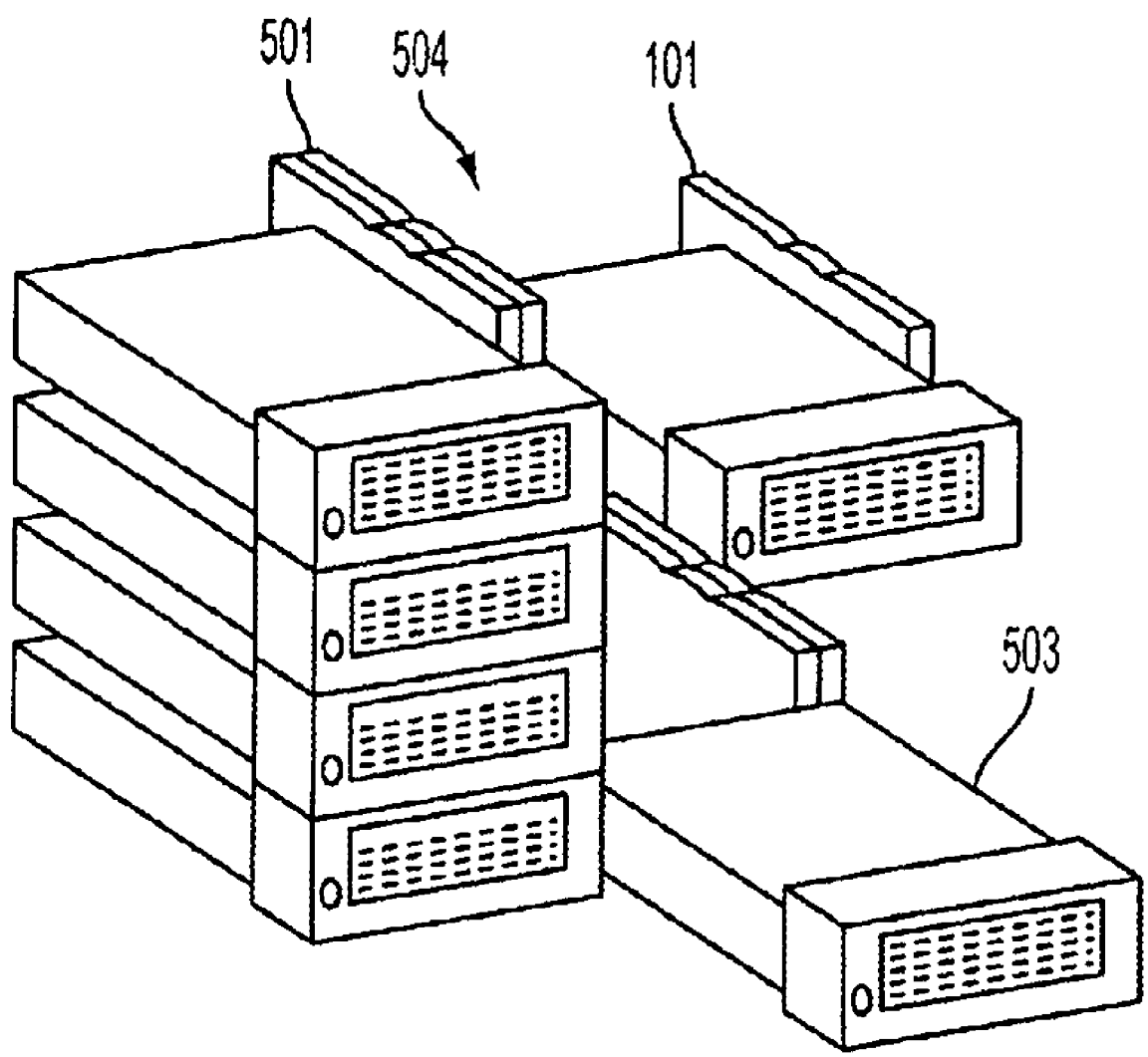
FIG. 3 is a partially exploded view of a first embodiment of the hard drive storage in a multiple hard-drive implementation.

Referring to FIG. 1A, a primary embodiment of the invention is illustrated from a first and includes a side panel 101 of a housing that incorporates an embodiment of the inventive hard drive suspension system. A second side panel is mounted (as also shown in FIG. 3, as in 501, but not shown in FIG. 1A) with the illustrated panel 101 so that both sides of the hard drive are in contact with the polymer springs (see below). In the illustrated first embodiment (which is only one configuration of many that are possible, from single drives—up to as many as required by the application), there are slots 106 for four hard drives which are separated by dividers 105. The suspension system in the present invention comprises a polymer compression member which in this embodiment is formed as one or more arched beams 102 that is incorporated into each of the dividers 105. The arched beams 102 contact the hard drives on the upper and lower surface.

In addition, there are compressive members 103 that contact the hard drives on the sides of the devices and compress as the drives are inserted into the slots of the sidewalls 101 (and 501). The "beams" of the present invention are therefore provide compression in both the vertical 102 and horizontal 103 axes of the hard drives due to the nature of the forces that will be encountered and the nature of the polymers that act as omni-directional counter-reaction(s) to all forces.

The actual first embodiment of the Hard Drive Haven™ employs beams of a similar conceptual design, as discussed above, but the actual structures may be very different in form factor as a result of detailed finite analysis. In a particular embodiment, multiple beams of varying stiffness will be employed to react to the multiplicity of stimuli the hard drives will encounter in operation. The diagrams enclosed are therefore intended to represent the concept and do so from a fundamental conceptual point of view. The multi-stiffness beams will be designed to work in unison with each other. The beams are employed as the load becomes more aggressive, for example, in shock. However, it is best to not allow the load to be too great on lesser strength beams before a stiffer load bearing beam is used.

In a first embodiment, the inventive suspension system has springs or spring-like structures 103 that engage the sides of the hard drive. These springs are similar to the springs in the dividers 105 as described above, but are mounted in the center of the slots 106 of the side panel. The side springs 103 are made of a flexible polymer and, in a preferred embodiment, have an arched structure that is attached at the ends of the beam to the side panel.

Other embodiments of the innovative enclosure also deliver a structurally efficient solution because of the strength to weight ratio of the materials chosen for use in the present invention. The molded plastics that are implemented in the present invention are greater than cold rolled steel, which is almost always used in such applications. For example, the mass of the polymer is generally on the order of .about.⅛th that of cold rolled steel. Increasing the strength to weight ratio is very important in implementing particular embodiments of the present invention because the mass of the systems including multiple hard drives is increasing, and the "floor loading" of data centers will not be able to accommodate bays that are filled with such mass dense packaging.

Particular embodiments of the invention also provide an assembly-conscious design that anticipates significantly reducing the effort required for manufacture. The Hard Drive Haven™ will "snap fit" into a sheet metal chassis. Reference 107 is a tongue (3 along the bottom of the bottom of the HDH™ and one at top center) that will fit into a slot in the sheet metal chassis (in the case where this is the final implementation). The top springs 102 will maintain the HDH™ in compression between the upper and lower sheet metal housing. FIG. 1A illustrates FIG. 1B from a front view, and FIG. 1C illustrates FIG. 1A from a side view.

Figure 2:
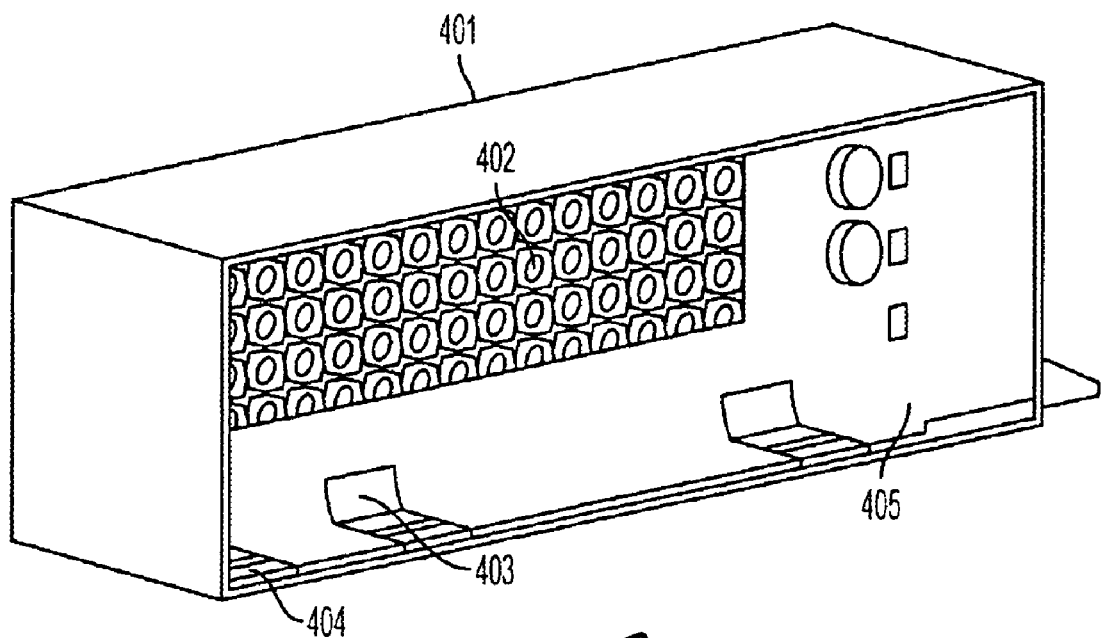
FIG. 2 is a perspective view of a first embodiment of a hard drive storage system of the faceplate as it interfaces with the sidewalls and to the drive.

Referring now to FIG. 2, various embodiments of the enclosure will include integral faceplates that incorporate attachment structures 403 which provide for a snap-fit attachment point for the hard drive to the faceplate 401. Additionally, the enclosure includes a single snap fit attachment structure for the hard drive/faceplate combination in to the structures in the HDH™ that are labeled 104 (in FIG. 1A) and 404. Therefore, some applications (such as enterprise applications, for example) require a three snap fit assembly steps for full HDH™ hard drive and faceplate assembly.

With the use of metalized plastics, the electro-magnetic aspects of an enterprise solution can also be accommodated. It will often be necessary in enterprise applications to accommodate light pipes to provide optical feedback so that the hard drives operate correctly. These light pipes can easily be accommodated in the side walls of particular embodiments of the invention.

FIG. 3 shows an example assembly of eight hard drives, 504. The hard drives can be mounted right side up or upside down (as shown) 503. System architecture will dictate the most prudent choice in this case. Embodiments of the invention can package the drives in very close proximity, but provide the necessary cooling air, structural integrity, vibration/shock/acoustic dampening, ease of assembly, and a multitude of other benefits that are all delivered at an exceptionally low cost.

Figure 5:
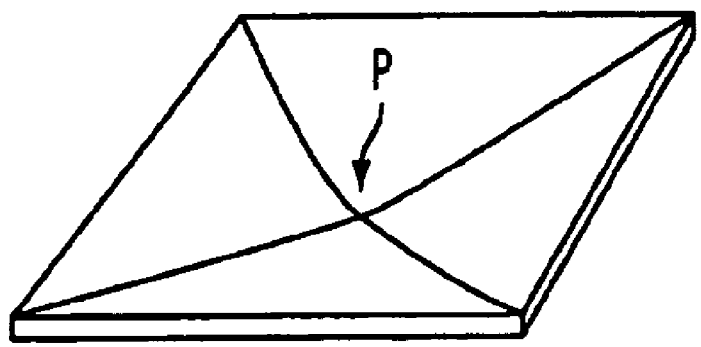
FIG. 5 is a representative example of the pre-stressed or load deflected compression polymer member.
Figure 6:
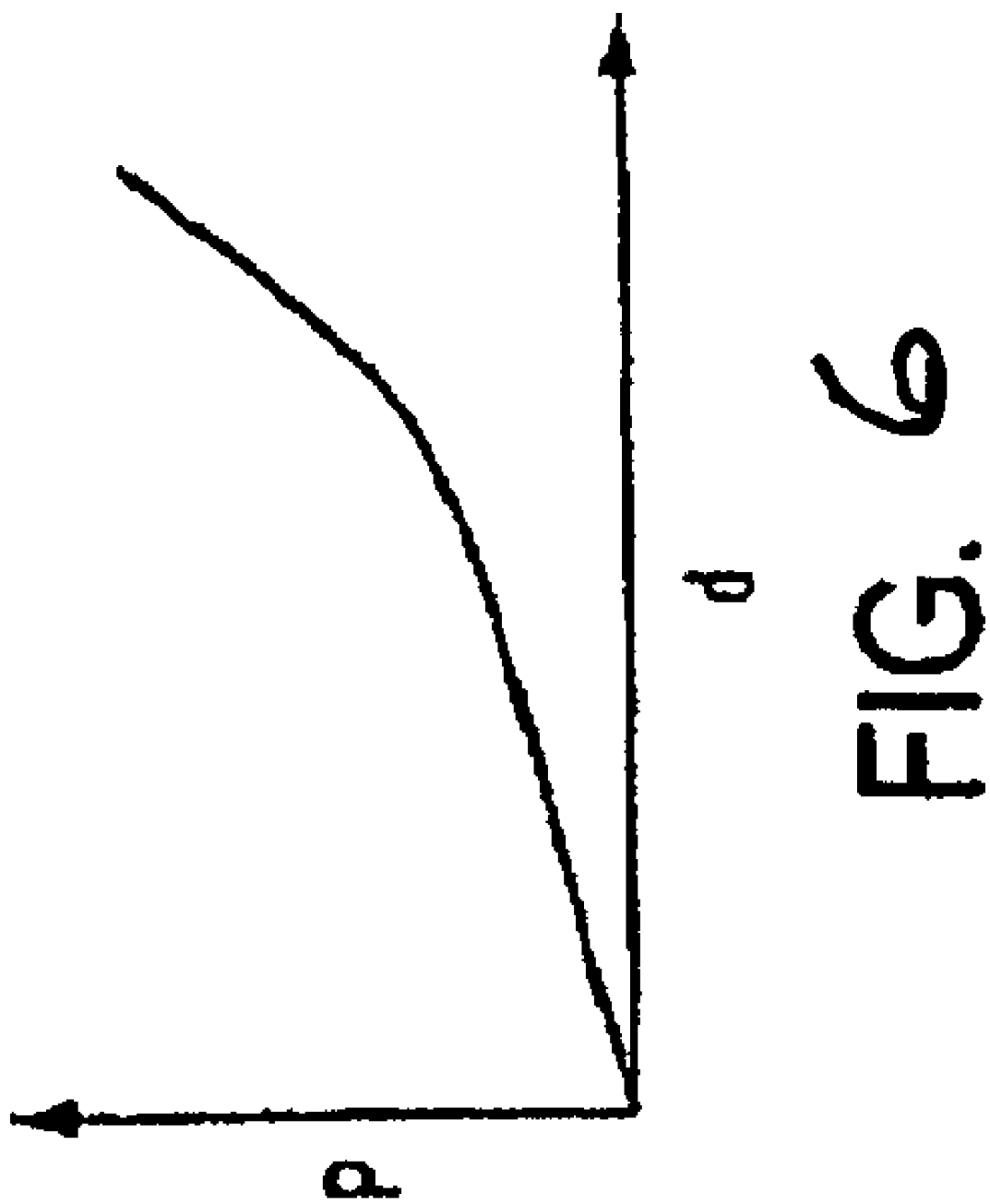
FIG. 6 shows the results of a deflecting load as represented in FIG. 5.

Referring now to FIGS. 5 and 6, a load deflection treatment and stiffening effect is shown. The stiffening effect results from the fact that the thin wall is stretched into tension as the plate deflects at P. The load deflection shown in FIG. 5, illustrates this phenomenon with the results shown in FIG. 6. For effective vibration control, it is often desirable to have a response that provides greater stiffness as the load increases. The behavior of membrane or shell stiffness in polymers provides this behavior without incremental cost. Simply, it is a function of the geometry. With proper material selection, the cross-section can be matched to the expected loading of the application. Diaphragm stiffening is a nonlinear increase in stiffness resulting from a change in curvature of a part. This effect is particularly pronounced when fixed boundary conditions are used.

There are a variety of different materials that can be utilized for the stiffening effect, depending on the device(s) form factors, level of dampening required and the magnitude of the input forcing function. Diaphragm stiffening is a nonlinear increase in stiffness resulting from a changed in the curvature of a part. This effect is particularly pronounced when fixed boundary conditions are used.

In many embodiments embodiment of the invention the lower mass and higher strength structures, reduced packaging complexity, with increased reliability, serviceability, and ease of assemble are all important factors to consider. The invention therefore eases the integration for these industrial design features including shipping replacements in which HDH™ drives can be shipped in their original packaging and assembled by attaching a face plate at the site by simply sliding into the side walls 101 and 501 (see FIG. 3).

Many embodiments of the invention requires virtually no packaging and accepts the drive into the shelf with nothing required but a faceplate. Such a packaging system leaves all of the cross-sectional area between the drives free for delivering cooling air. This is important not only for the proper operation of the drives, but it is also very important for other system components downstream of the drives; these components, often containing processors, can reject a great deal of heat. It is critical that drives be well cooled, and that the portion of the system in which they reside is not so densely packaged so as to slow the flow in the entire system. The HDH™ makes sure that as much of the critical air flow volume is available for the system components.

The inventive suspension system of the present invention has numerous cutouts in the side panels. These "holes" are generally located next to the tops and bottoms of the hard drives allowing air to more freely flow over the upper and lower surfaces. The increased air flow, allows the inventive system to more easily cool the stacked hard drives through convection heat transfer.

The invention also addresses the thermal environment: it is a widely held opinion that the performance and length of time in which a hard drive will continue to function is inversely proportional to the temperature of the environment in which it operates. The actual degree to which the temperature is elevated is where the debate lies, but it is clear that the lower temperatures are better. With that said, one needs to understand the reality of where the hard drives will be deployed to realize that there in no good way to be certain of the ambient temperature because the temperature depends on the final implementation. Therefore, the drives will have to operate under a number of environmental ambient temperature states. As noted by FIG. 4. since the temperature of the cooling air cannot be guaranteed, it is critical to guarantee that there is enough air to effectively remove the heat that the drive itself generates. Please note that the majority of the hard drive market is moving rapidly toward very dense packaging in order to provide low cost data storage solutions. The increasing packaging density and the ever increasing capacity of the hard drive makes the thermal environment ever more aggressive for the hard drives and incrementally reduces the life expectancy of the hard drives. The need to get whatever little air possible to the drives and efficiently removing whatever heat possible is more critical than ever before. As shown below, the present invention addresses the thermal issues as well as many other aspects of hard drive packaging.

Figure 4:
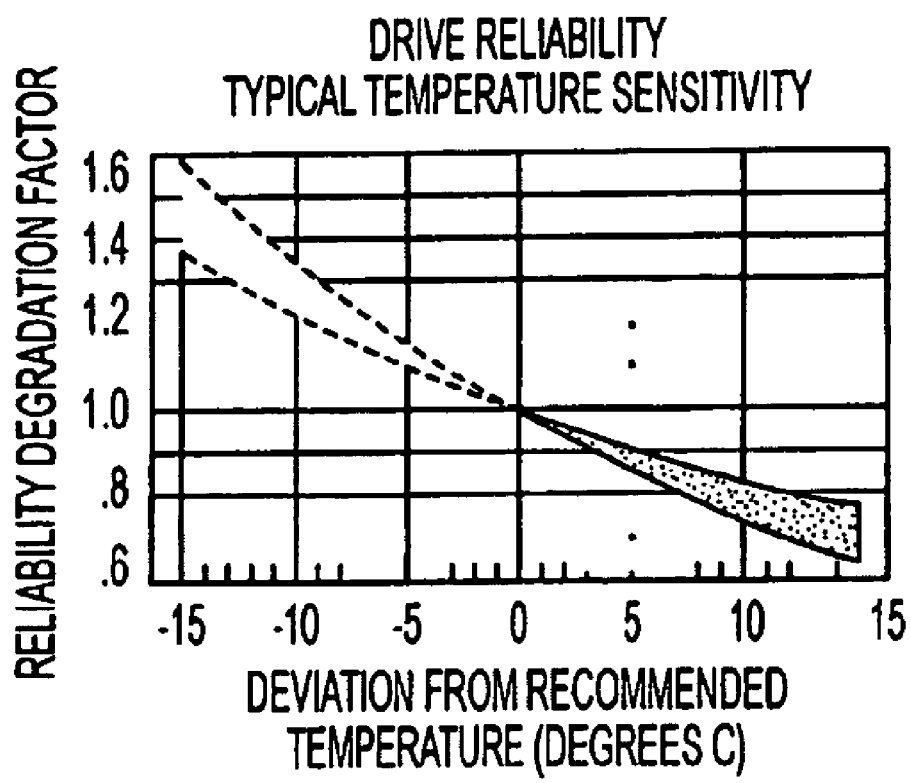
FIG. 4 illustrates the relationship between performance and temperature.

To look at an example of the relationship between temperature and hard drive (MTBF=Mean Time Before Failure; HDD=Hard Disk Drive). FIG. 4 shows the dramatic effect that temperature has on the overall reliability of a hard disk drive. Derivations from a nominal operating temperature (assumed to be maintained over the life of a drive) can result in a derivation from the nominal failure rate. As the temperature exceeds the recommended level, the failure rate increases two to three percent for every one degree rise above it. For example, a hard disk drive running for an extended period of time at five degrees above the recommended temperature can experience an increase in failure rate of 10 to 15 percent. Likewise, operating a drive below the recommended temperature can extend drive life.

Normal mounting systems rigidly attach the hard drive to the slots or bays of a storage unit with screws and sheet metal slot components that physically contact the hard drive. Because of this rigid connection outside vibration is transmitted to the drive and the vibrations produced by the hard drive are transmitted to other hard drives in the housing exacerbating the vibration problem. In contrast to a rigid connection the inventive hard drive suspension system isolates the hard drive from the frame with polymer springs which effectively dampen the transmitted vibrations. The polymer springs allow the hard drive to move in all three axes.

In addition to vertical movement, the hard drive may also move from side to side or forward and backward in the slot. This freedom of movement results in reduced vibration transmitted to the hard drive from external sources. In addition to the mechanical spring properties, the polymer also has vibration absorption characteristics. In a normal spring, the physical energy resulting from compression is stored and released as the spring expands. In a preferred embodiment, the polymer springs are made of a material that absorbs some of the compression force and converts this energy into a different form. The energy may be converted into heat energy or alternatively, with a pizo-electric mechanism the physical energy can be converted into electrical energy.

Figure 7:
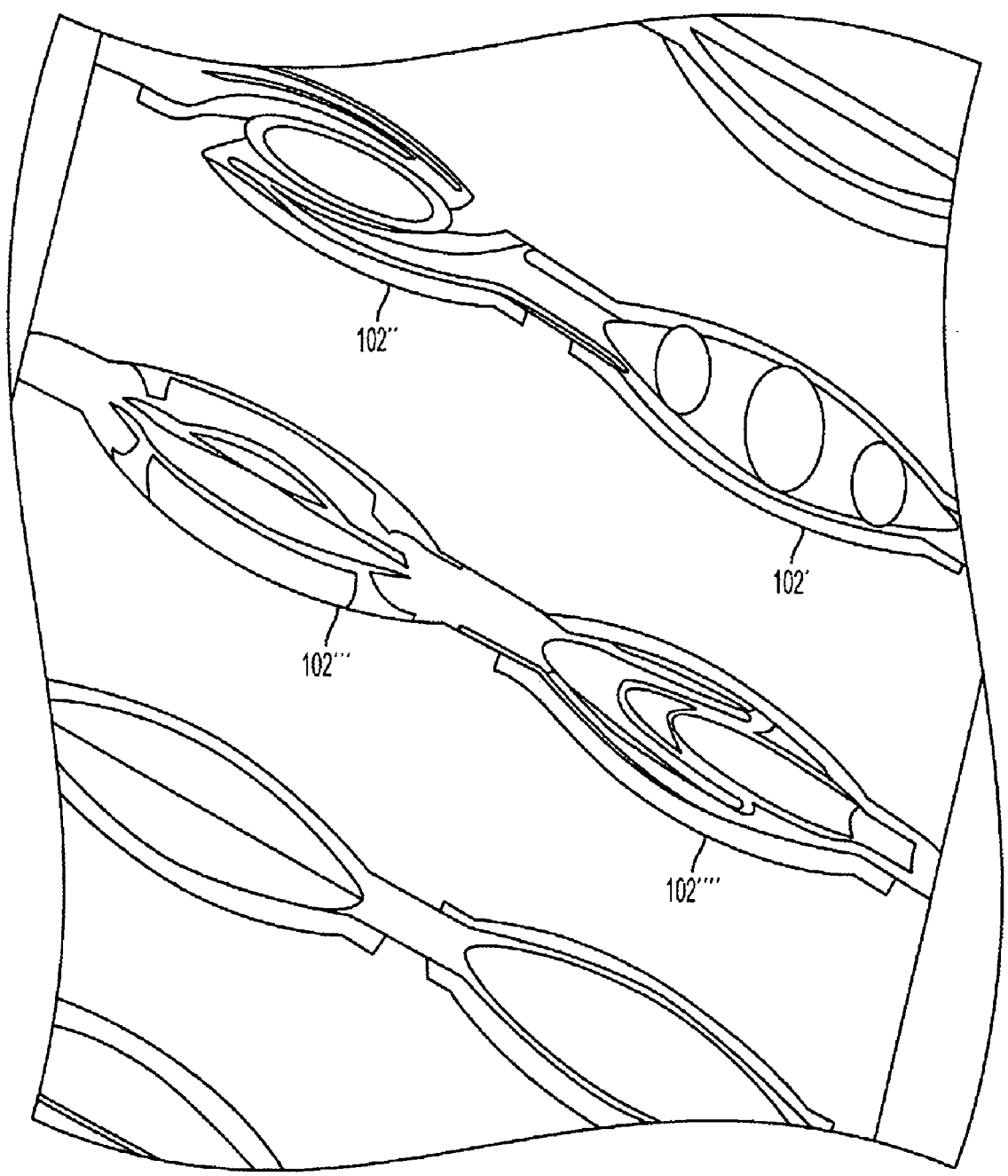
FIG. 7 illustrates the features of some alternate types of pre-stressed coils or members.

Referring now to FIG. 7, examples of alternate types of "polymer spring" configurations 102', 102", 102''' and 102'''' that may be used as alternatives structures to the pre-stressed polymer springs shown in FIGS. 1a-3, which are generally shown in the form of an arched beam. These alternate spring forms may be in the forms of coils or other shapes.

Embodiments not illustrated include an invention a "retro-fit" enclosure RFE that provides hard disk drives with reduced shock and vibration is shown and can be used with many existing hard drives, providing flexible storage needs. Many of the same principles as discussed above (particularly in FIGS. 5-6) apply applying to the "retro-fit" enclosure embodiment of the invention. The hard disk drive fits into the hard disk space in the interior of the enclosure.

Figure 1B:
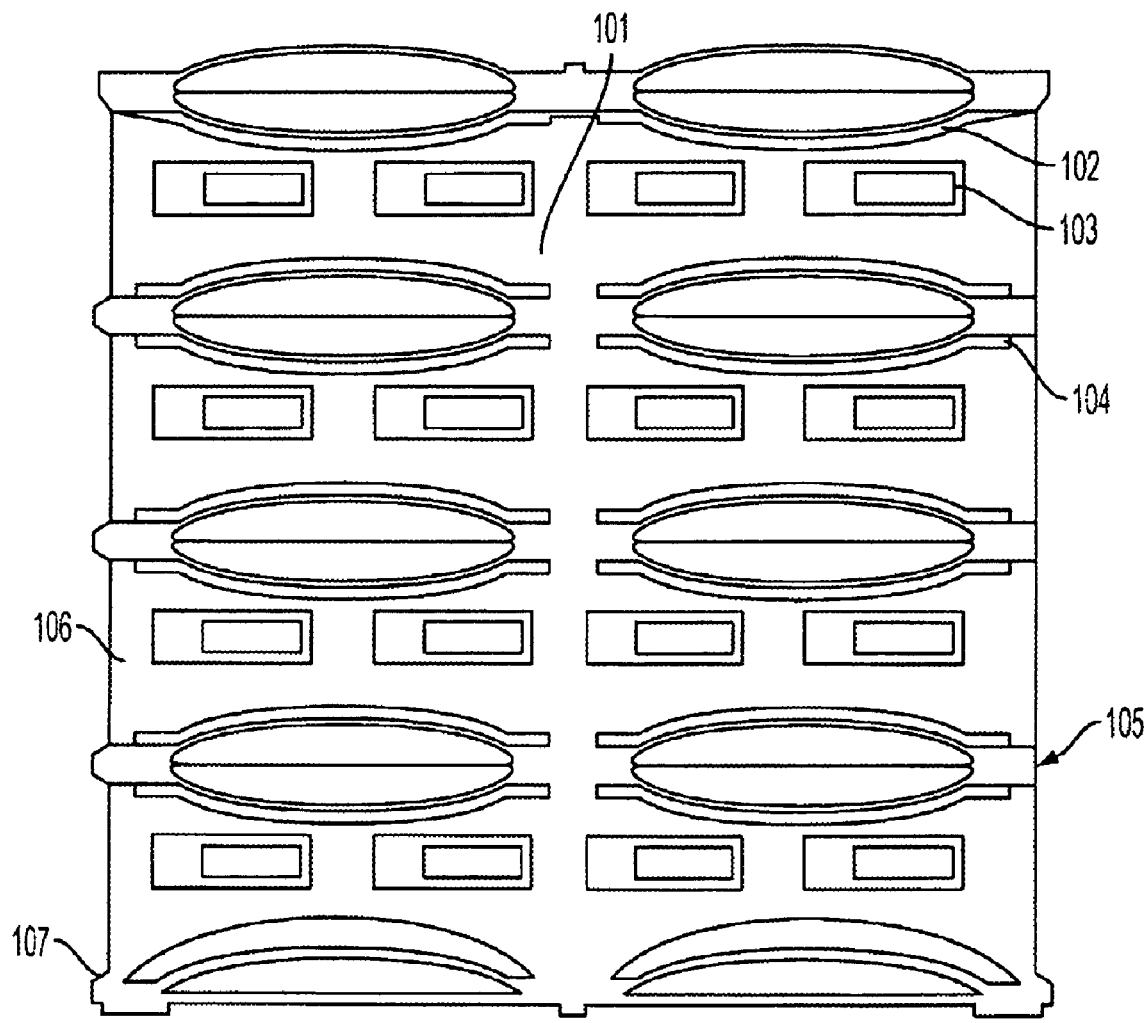
FIG. 1B is a front view of a first embodiment of a hard drive storage system.
Figure 1C:
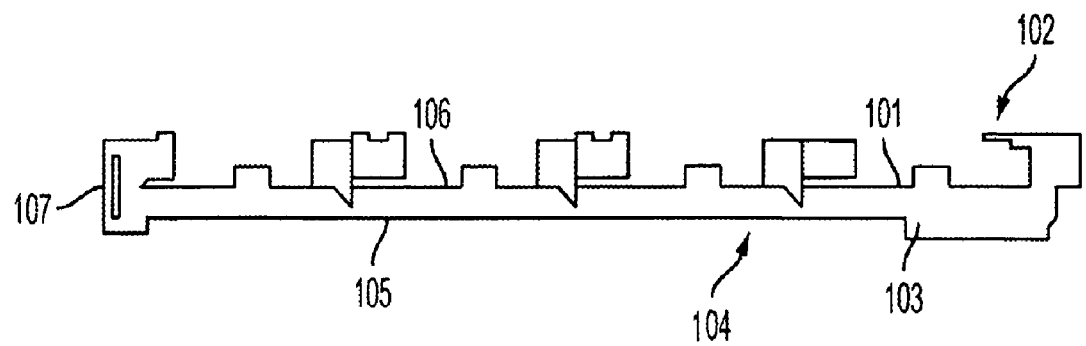
FIG. 1C is a side view of a first embodiment of a hard drive storage system.

Referring now to FIGS. 8-12D, another embodiment of a hard drive enclosure (known by the trade name of "Stealth-drive®3") STE3 is shown, that provides reduced vibration in a membrane spring "body." Essentially, the pre-stressed polymer load member has been moved from the walls, as shown in FIGS. 1A-C, to the enclosure body EB in a series of horizontal and vertical compression members.

Figure 8A:
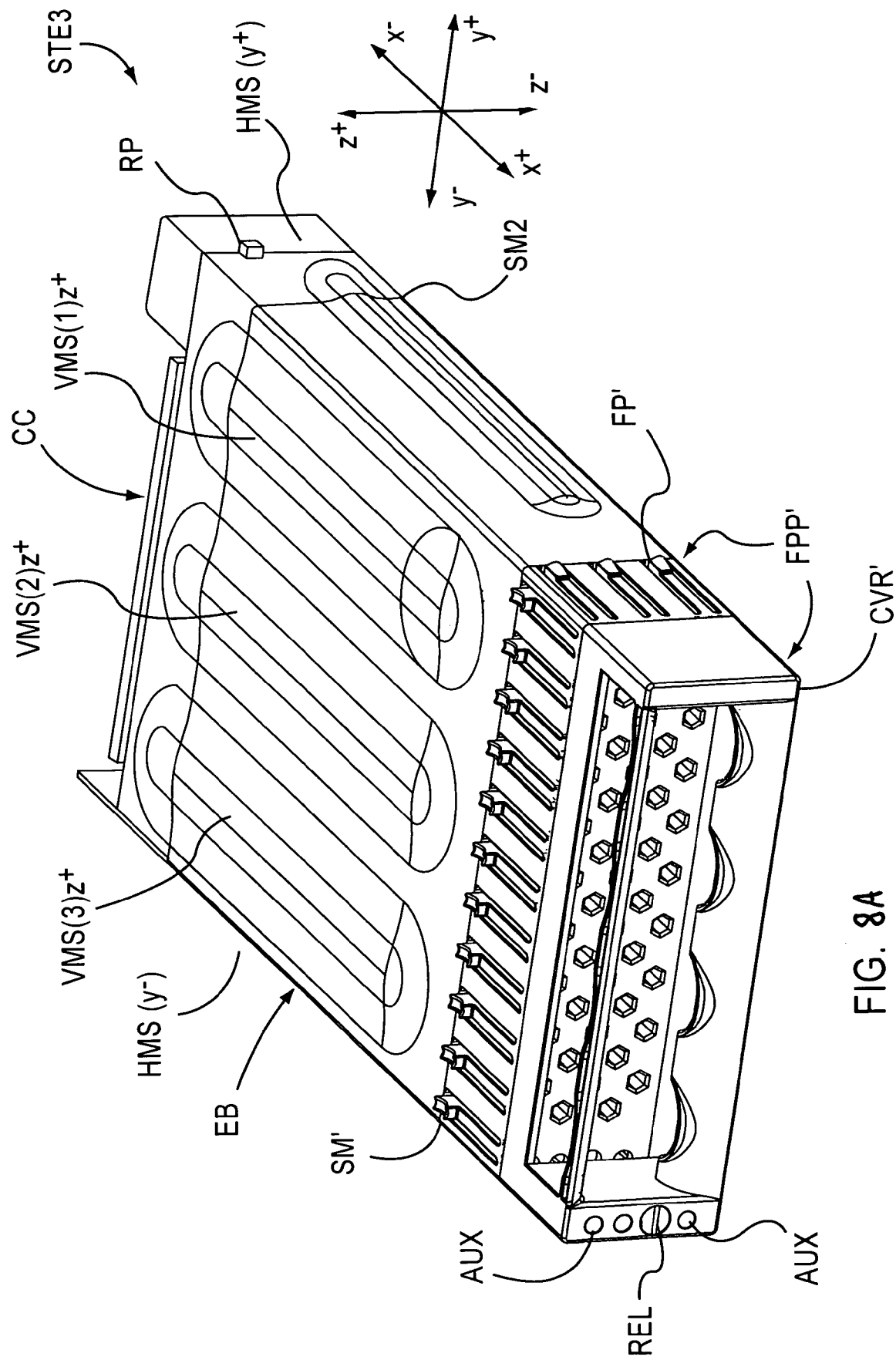
FIG. 8A shows a front isometric view of the alternate embodiment of the hard drive enclosure.

Referring now to FIG. 8A, a retrofit enclosure for a hard disk drive enclosure is shown that provides vibration and shock protection. A front plate portion FPP of the enclosure generally snap fits into an enclosure body EB at a seam SM. The front plate portion FPP includes a cover portion CVR and a front plate FP. The front plate FP may be made of many different types of materials, including, but not limited to, electromagnetic interference EMI shielding polymers. The advantages of such materials may include coated and filled EMI shielding polymers, but are filled (or conductive) polymers, such as Primere®, a nickel-plated polymer that provides EMI protection, in a preferred configuration of the retro-fit enclosure. Certain configurations of the front plate portion FPP are discussed in U.S. Pat. No. 7,064,265, entitled Reduced-gasket EMI-shielding solutions for hard disk drives and other computer components, by Cochrane, and issued Jun. 20, 2006, and incorporated by reference for all purposes.

The enclosure portion, includes many structures configured, and generally injection-molded into the polymer to allow for vibration reduction and improved performance. In general the enclosure portion is made of a lightweight polymer that is generally easily manufactured and molded and formed with the pre-stressed polymer components, the horizontal compression members and the vertical compression members where x.+-. and y.+-. and z.+-. are the directional components. The enclosure portion shows three horizontal compression members on each side, as well as two vertical compression members on opposite sides. A rear compression member (not sown) is also present and is located on the rear side of the enclosure body and is a "bent over" leaf spring or cantilever-type spring.

An auxiliary section AUX is formed in the front plate portion, such that appropriate lights and indicators can be placed into the retrofit hard drive enclosure. In addition, a secure locking mechanism which includes a release REL is located in the auxiliary section (which is shown on the y− side, but can be located at either the y+ or y− sides), and which is a secure locking mechanism in a preferred embodiment of the retrofit enclosure, which can include a ¼-turn locking mechanism.

A very important aspect of the Stealthdrive 3 embodiment of the invention is that it provides for the optimum hard driver serviceability method. The Stealthdrive3™ alternate embodiments of the invention allows for the swapping of an HDD directly from the original hard disk drive manufacturers packaging. In the case of a failed hard disk drive, the service personnel can remove the failed drive, in the Stealthdrive carrier, remove the failed hard drive from the Steathdrive®, all polymer, carrier (FRU) and put the new hard drive into the Stealthdrive carrier, right from the original hard drive manufacturer packaging. The drive is protected by the ESD bag (as packaged by the original hard drive manufacturer) and also by the service technician, who will be wearing an ESD ankle and wrist strap, during the process of swapping the hard drive right at the NAS/SAN/CPE equipment.

The alternate embodiment of the enclosure STE3 is generally formed from three or four separate components that may be snap-fit or otherwise easily put together. The front plate portion FPP' is similar to that discussed above, and includes a front plate FP and a cover CVR. The enclosure body EB usually is easily attached to the front plate portion FPP', and will be discussed below. The rear portion RP is also easily fit into the enclosure body, and also incorporates the membrane spring concept. In some configurations of the alternate embodiment, a snap fit conversion card CC is required for proper enclosure of a hard-disk drive, and is generally compatible with varieties of hard disk drives from different manufacturers.

Referring further to FIG. 8A, the alternate embodiment of the protective hard-drive enclosure STE includes a molded polymer body "sleeve" EB that is formed to include membrane springs on all 4 sides, including both xy faces and both xz faces. The value of the membrane springs in "diffusing" vibrational and shock stresses is described above in FIGS. 4-6, and is detailed below in FIGS. 10A and 10B. The body "sleeve" EB as shown includes three vertical compression members each on the "top" VMS(z+,1), VMS(z+,2) VMS(z+, 3) and "bottom" VMS(z−,1), VMS(z−,2), VMS(z−,3) (shown in FIG. 8D, a bottom view of the alternate embodiment of the protective hard drive enclosure STE3). The body "sleeve" also includes two horizontal compression members formed into the body, along the XZ sides, including the HMS(y+) (shown) and HMS (y−) (not shown).

Figure 8B:
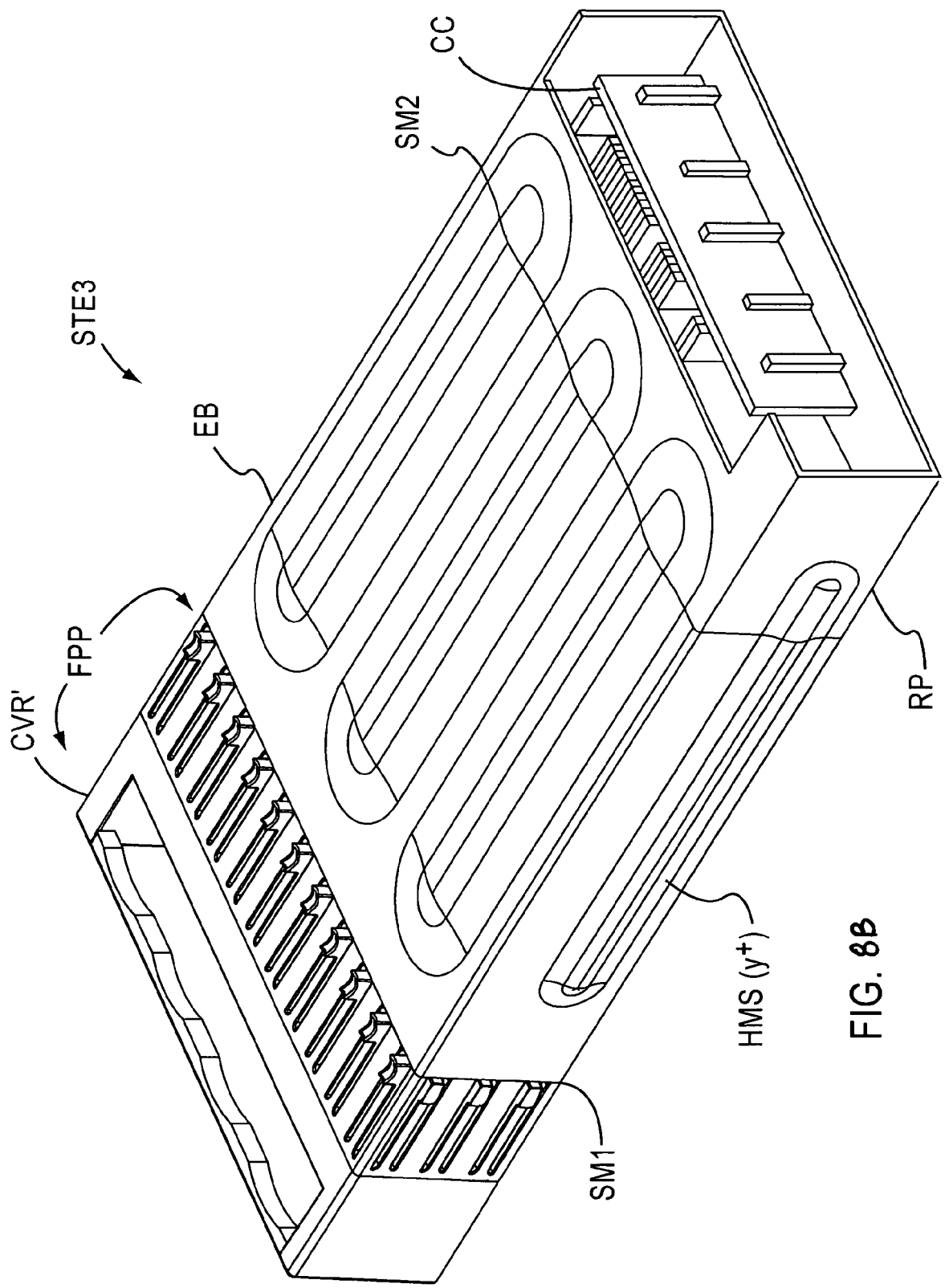
FIG. 8B shows a rear ISO view of the h alternate embodiment of the hard drive enclosure.
Figure 8C:
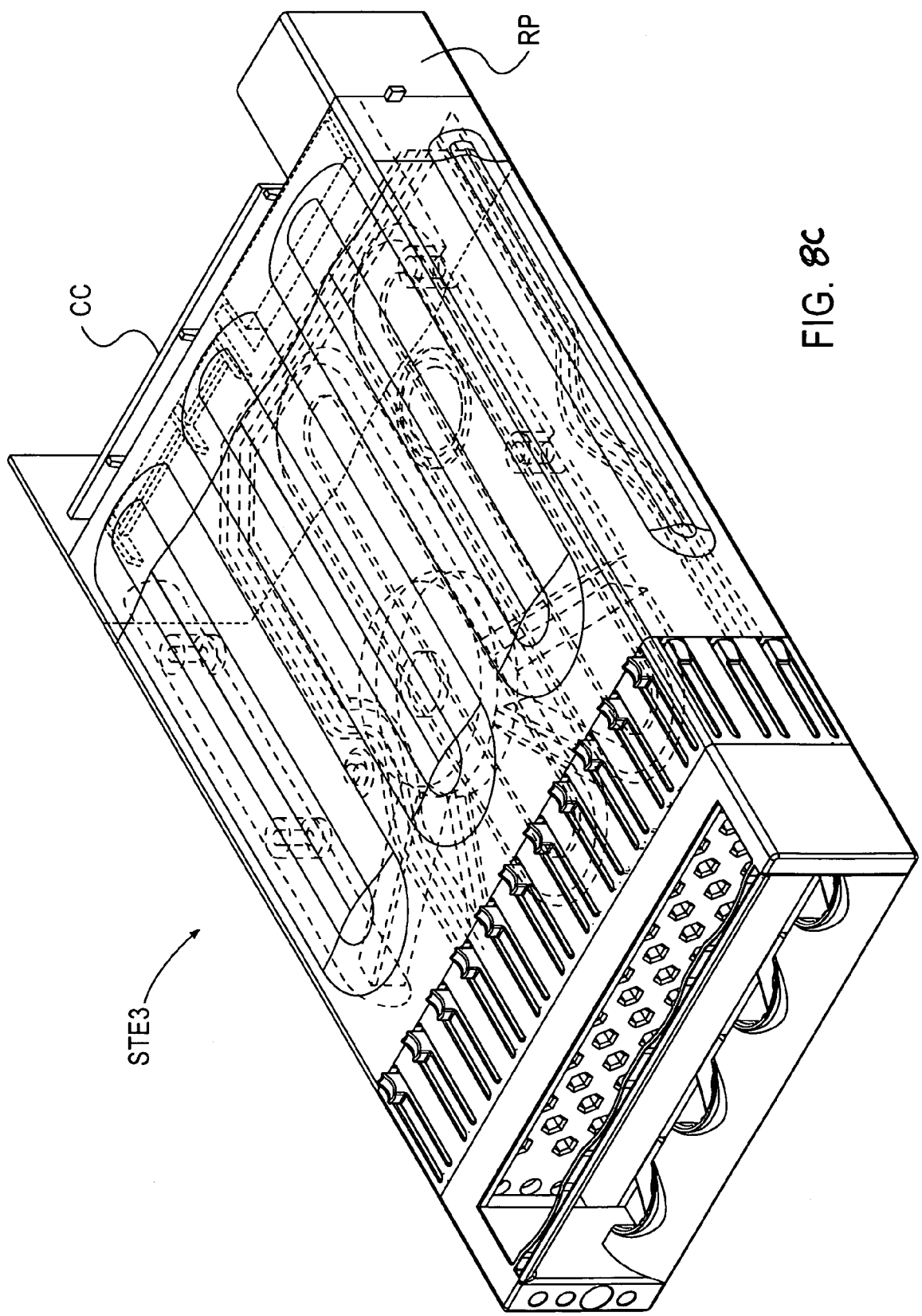
FIG. 8C illustrates a "ghost view" of the alternate embodiment of the hard drive enclosure.
Figure 8D:
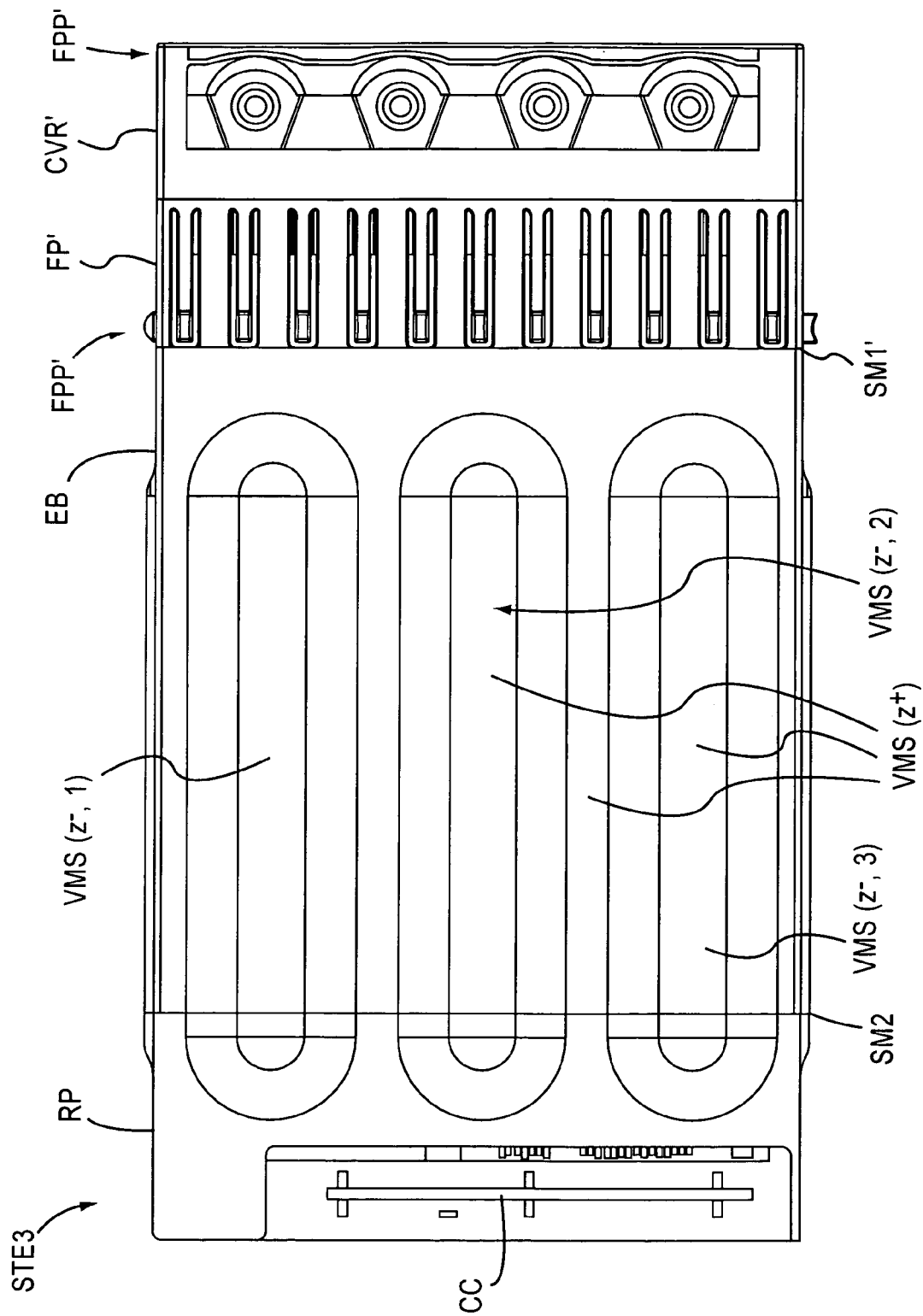
FIG. 8D illustrates a bottom view of the alternate embodiment of the hard drive enclosure.
Figure 8E:
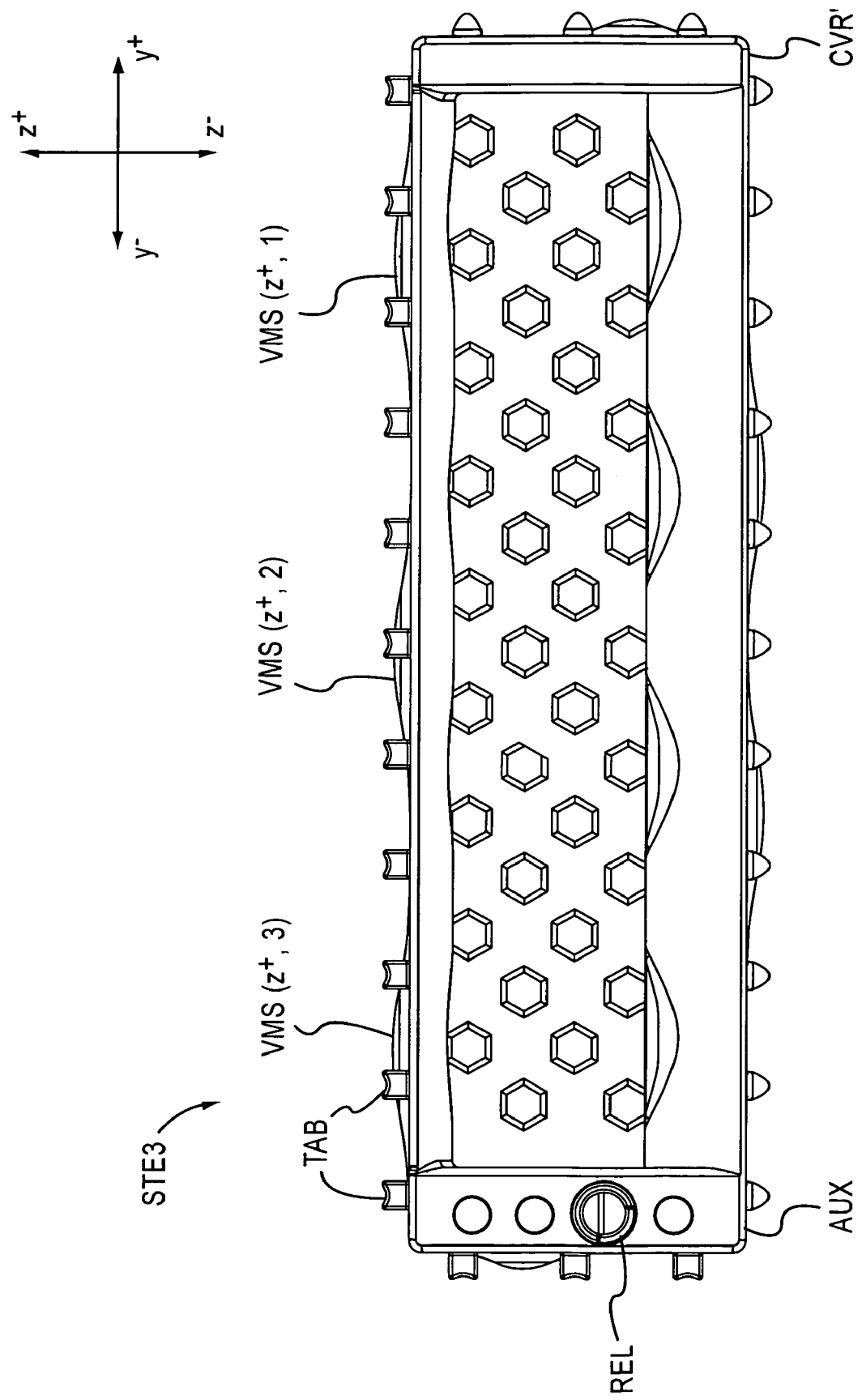
FIG. 8E illustrates a front view (solid) of the alternate embodiment of the hard drive enclosure.
Figure 8F:
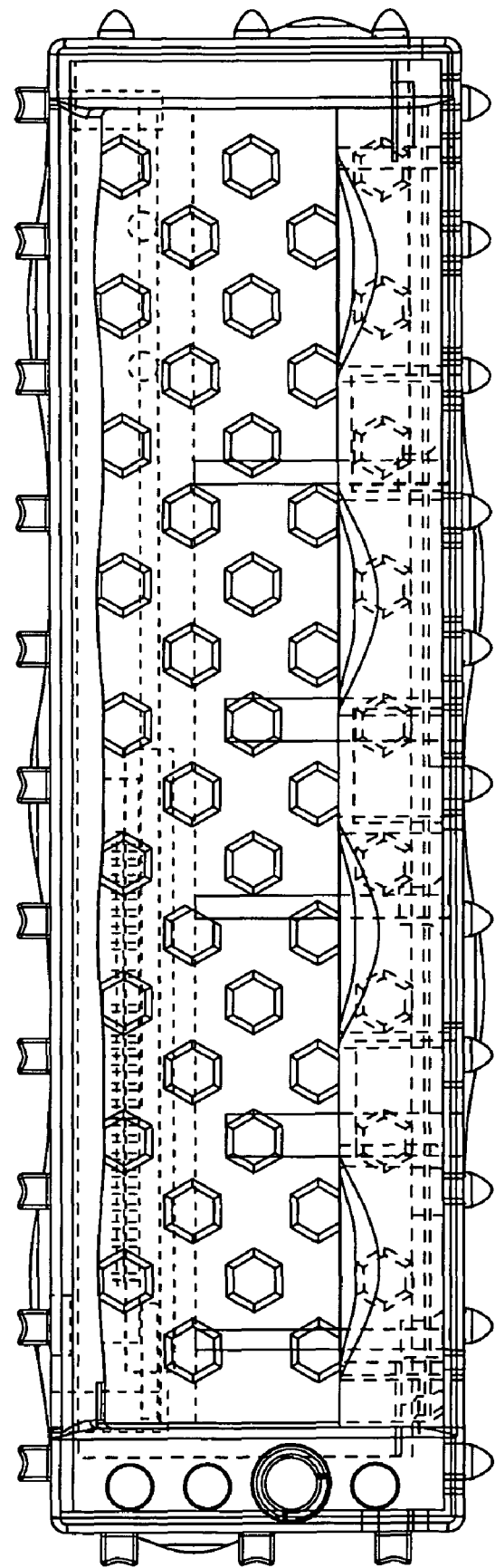
FIG. 8F illustrates a front view (ghost) of the alternate embodiment of the hard drive enclosure.
Figure 8G:
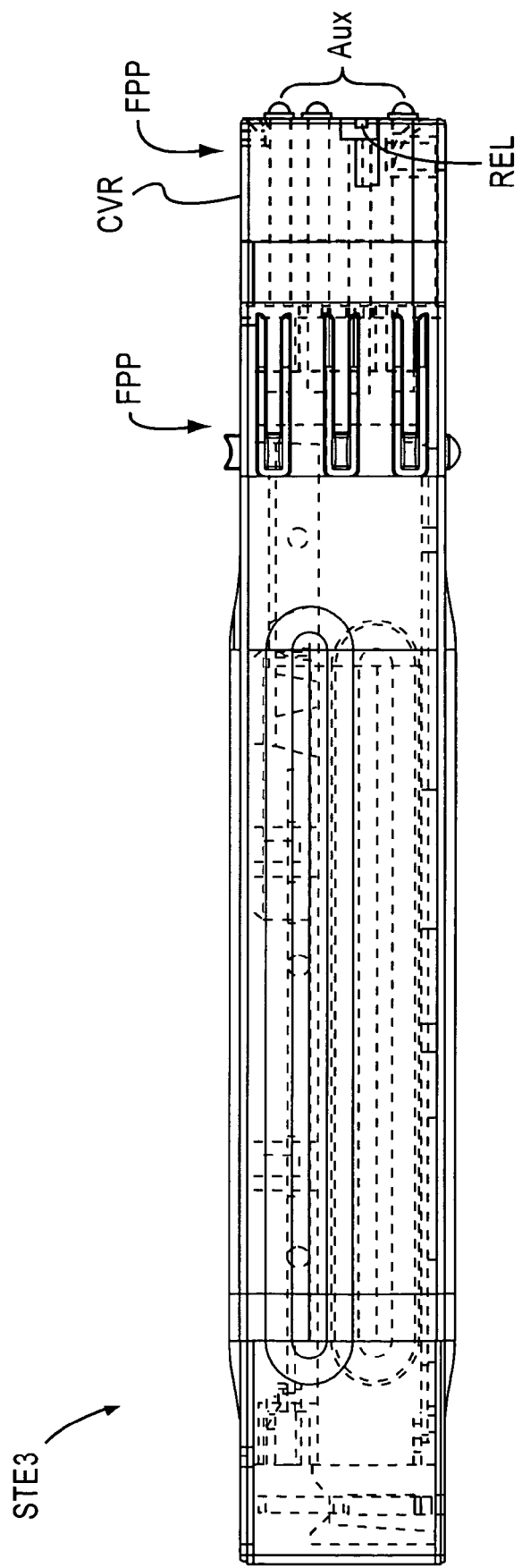
FIG. 8G illustrates a side (ghost) view of the alternate embodiment of the hard drive enclosure.
Figure 8H:
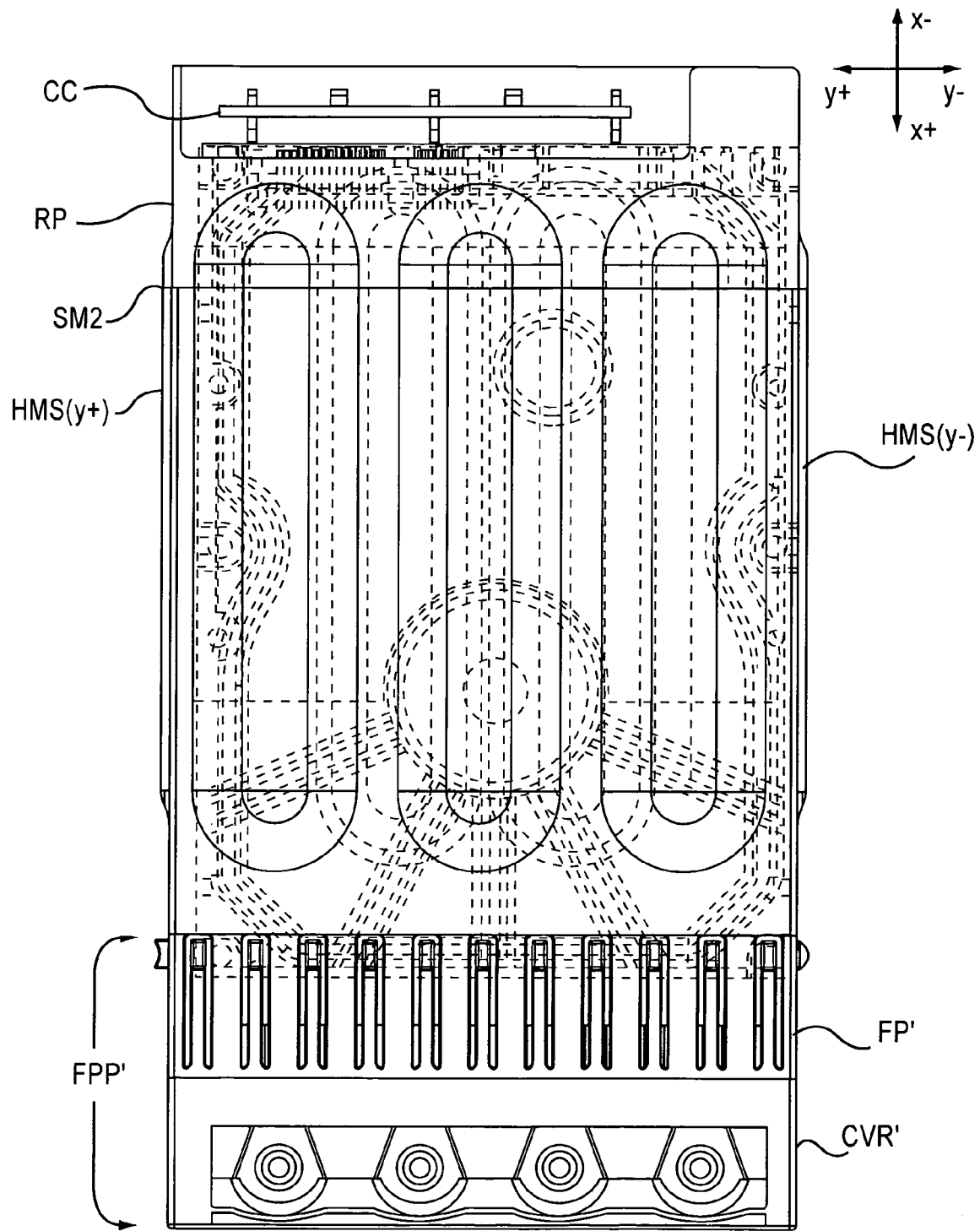
FIG. 8H illustrates a top (ghost) view of the alternate embodiment of the hard drive enclosure.

FIG. 8B is a flipped view of the alternate embodiment of the protective hard-drive enclosure STE3. FIG. 8C is a "ghost view" of the alternate embodiment of the hard drive enclosure. FIG. 8D is a bottom view (of the solid structure) of the enclosure in which the compression members on the z-(bottom) side are visible, and FIG. 8H is a "ghost" or cutaway view of the bottom of the enclosure STE3. FIG. 8E is a solid view of the alternate enclosure STE3 from the front, and FIG. 8F is a "ghost" or cutaway view of the alternate enclosure from the front view. FIG. 8G is a ghost or cutaway view of the enclosure from the side.

Figure 9A:
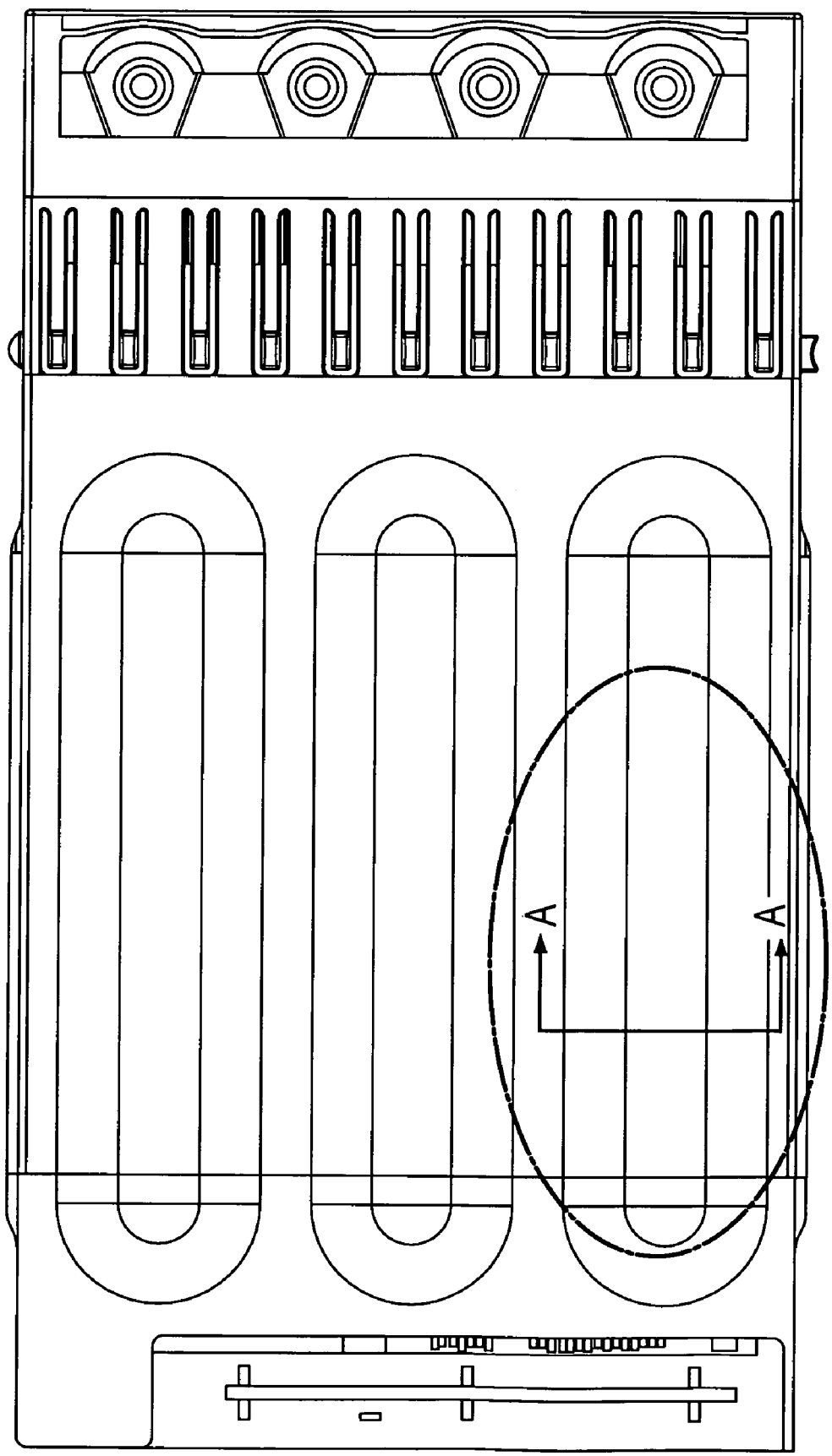
FIG. 9a shows a first membrane spring detail in the alternate embodiment of the hard drive enclosure.
Figure 9B:
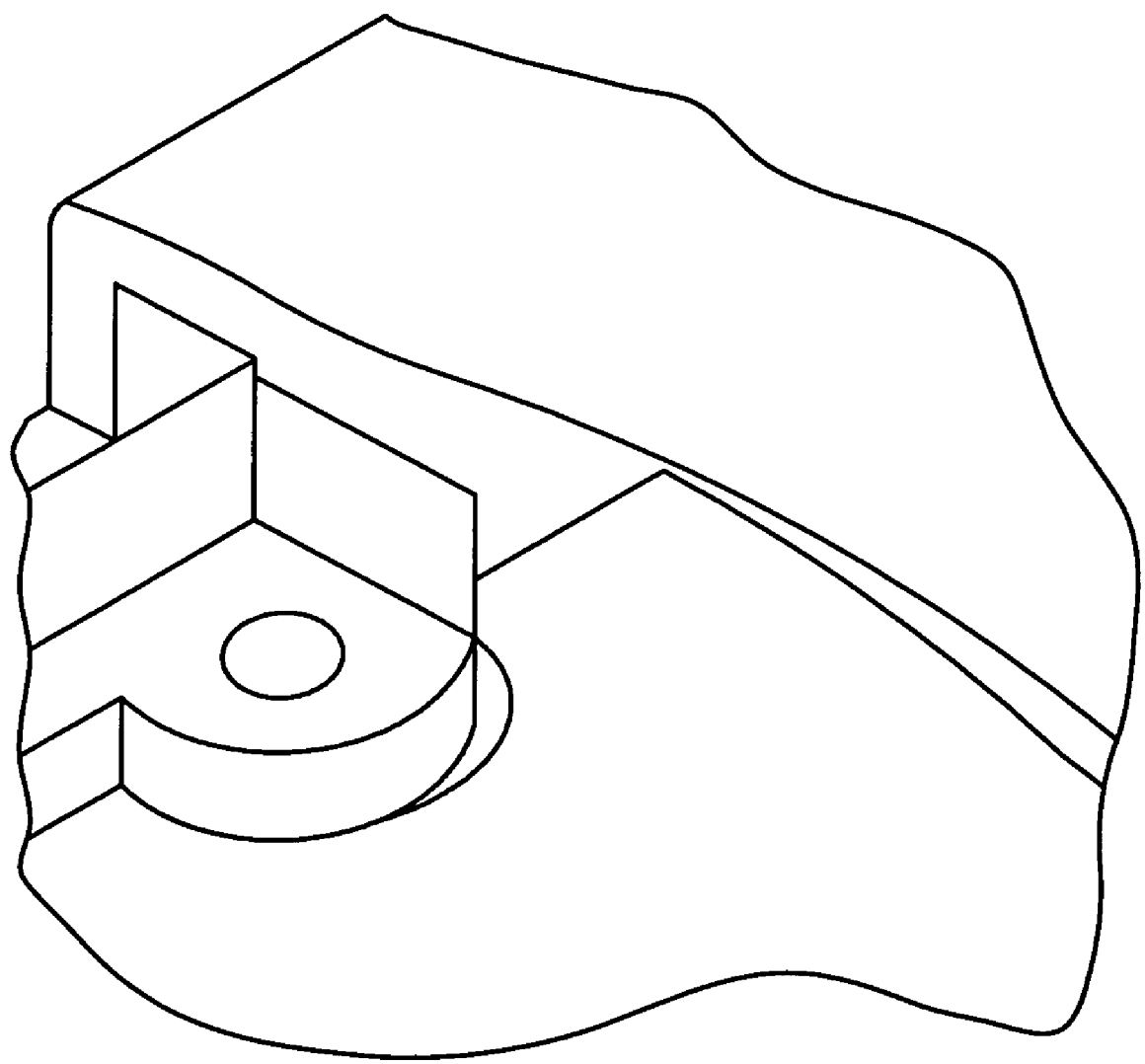
FIG. 9b shows a blow-up view of the membrane spring as shown in FIG. 14A.
Figure 9C:
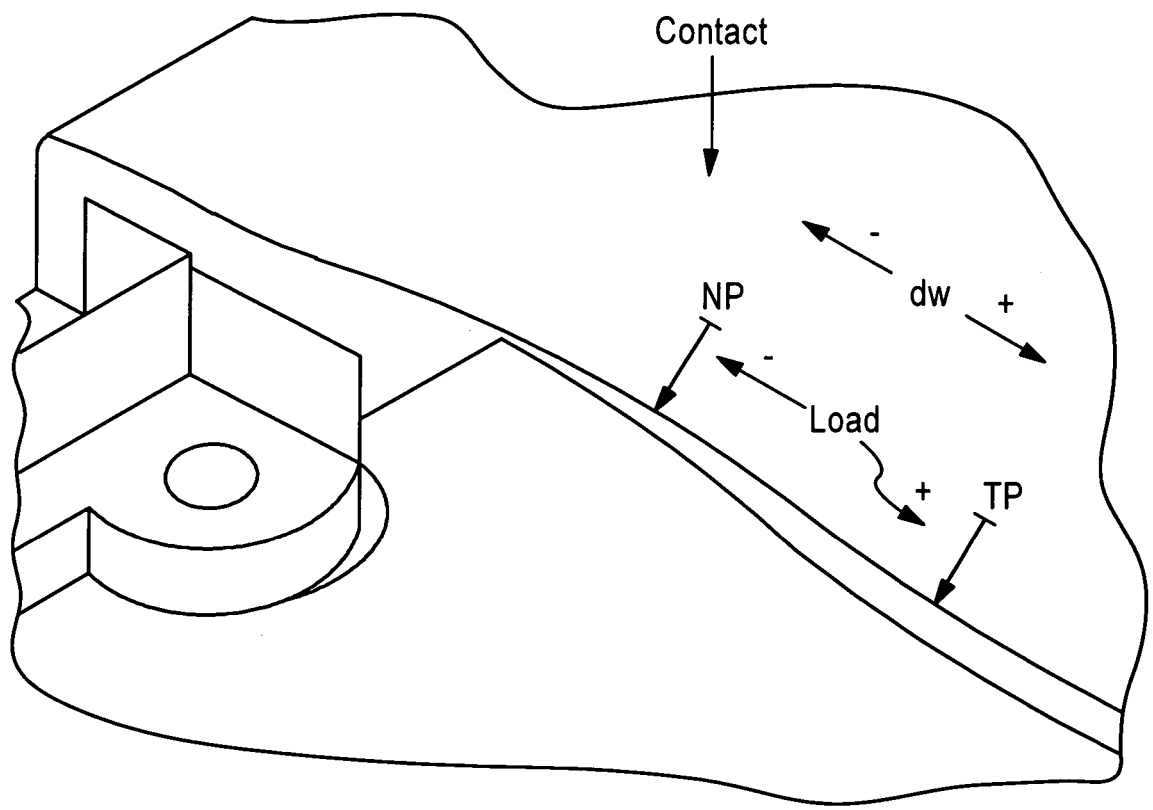
FIG. 9c shows a detail view of the membrane spring.
Figure 9D:
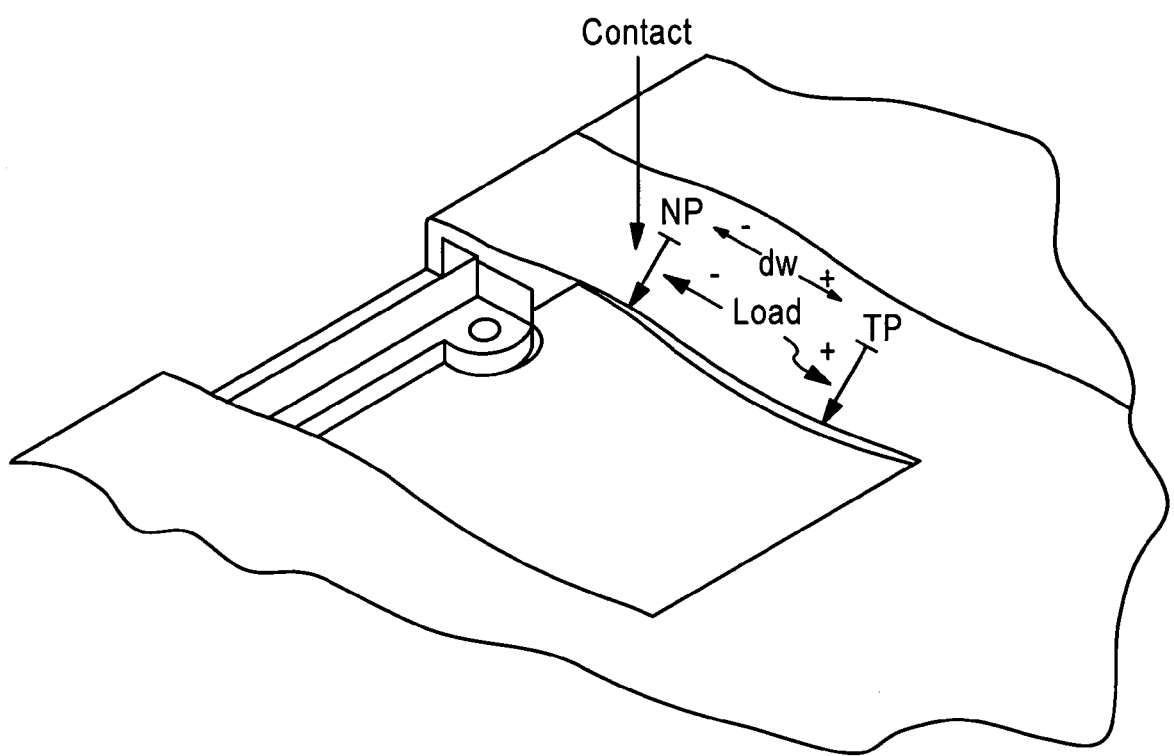
FIG. 9d illustrates a macro view of the details of the membrane spring.

FIGS. 9A and 9B illustrate the membrane spring or polymer compression member as used in the alternate embodiment of the hard drive enclosure. The A-A indicator along FIG. 9A is shown in cutaway detail in FIG. 9B (and more detail in FIGS. 9C and 9D), such that in a preferred configuration of the alternate embodiment Referring to FIGS. 9C and 9D, details of the cutaway view of the "membrane" compression member are shown. FIG. 9C shows a sample cross-section of a membrane spring, in which the thickness of the spring thickness, dw– to dw+, as it moves from the narrowest portion NP to the thickest portion TP of the spring. In general the contact causing the compression will be at the narrowest portion NP, but the load will deflect from the narrowest portion NP to the thickest portion TP, as the need arises. As seen in FIGS. 12A-D, the contact of the membrane spring in the alternate embodiment is generally against other membrane springs from other alternate embodiments of the hard drive enclosure.

Figure 10A:
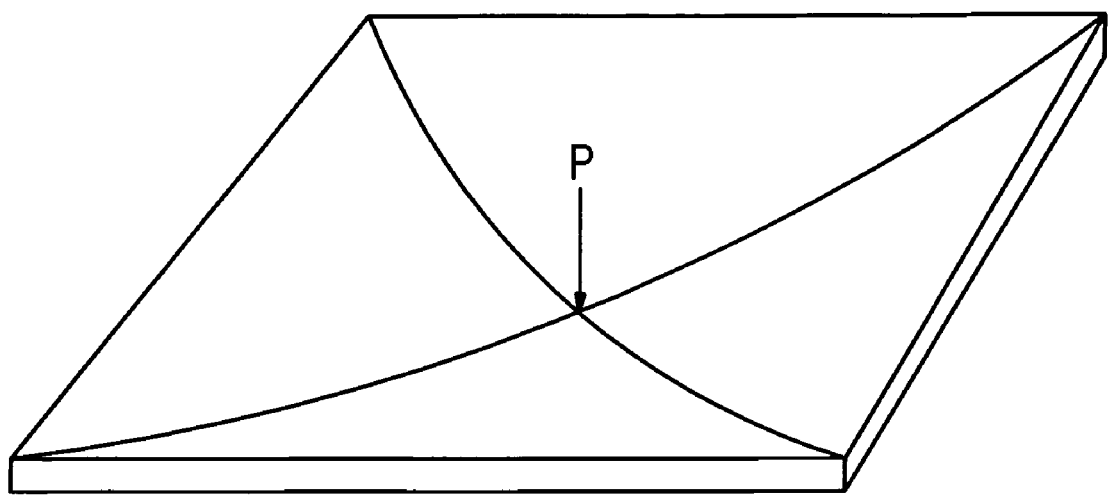
FIG. 10a illustrates a conceptual "load deflection" for a membrane spring.

As illustrated by FIGS. 10A and B, the "membrane" polymer compression provides an important aspect of the alternate hard-drive enclosure. Although discussed above in FIGS. 4-6, the implementation of the variable thickness pre-stress polymer member in the form of a membrane spring allows for the economical use of the pre-stressed polymer in dissipating vibration and shock (an extreme form of vibration). Thus, the more the load of vibration that requires absorption, the further "down" the variable thickness the wave has to "travel." Therefore, the polymer is not stressed unnecessarily for the light vibration dissipation, but is available to eliminate the more serious vibration creep and shock on the thicker parts of the membrane spring.

Figure 10B:
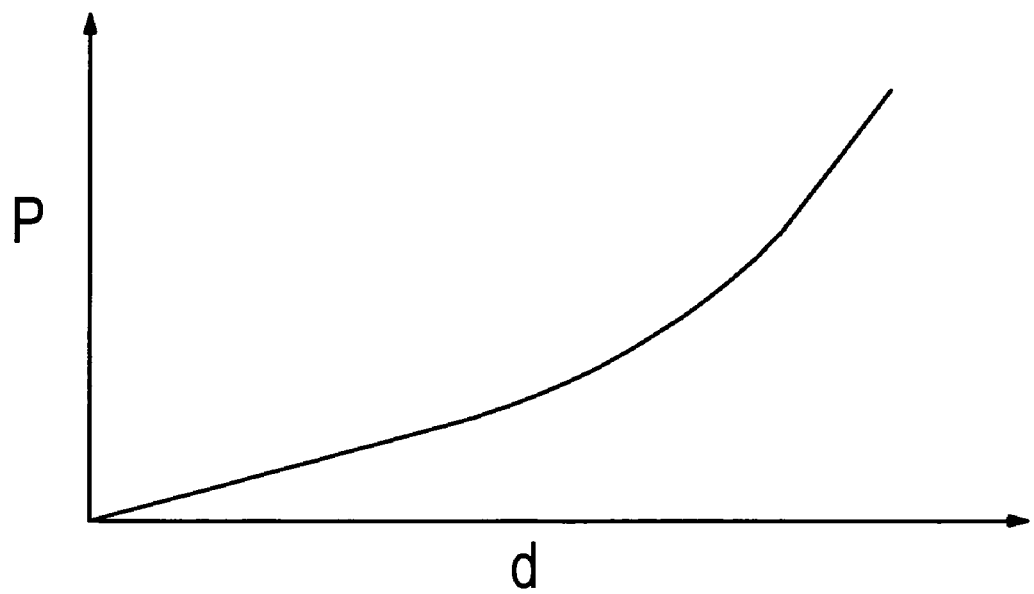
FIG. 10b illustrates conceptual results for a "load deflection" for a membrane spring.

For effective vibration control, it is often desirable to have a response that provides greater stiffness as the load increases. The behavior of Membrane or shell stiffness, in polymers, provides this behavior without incremental cost. Simple it is a function of the geometry. With proper material selection, the cross section can be matched to the expected loading of the application. Diaphragm stiffening is a nonlinear increase in stiffness resulting from a change in curvature of a part. This effect is particularly pronounced when fixed boundary conditions are used. There are a variety of different materials that can be utilized depending on the devices form factors, level of damping required and the magnitude of the input forcing function. Diaphragm stiffening is a nonlinear increase in stiffness resulting from a change in curvature of a part. This effect is particularly pronounced when fixed boundary conditions are used. The stiffening effect results from the fact that the thin wall is stretched into tension as the plate deflects. The load deflection shown by FIG. 10B, illustrates this phenomenon.

It can be appreciated by those skilled in the art that the use of a variable width/variable load membrane spring is preferred in certain implementations of the alternate embodiment, but the implementations of the alternate embodiment of the enclosure are not limited to such structures. Although, the use of other types of pre-stressed polymer members is discussed above.

Figure 11:
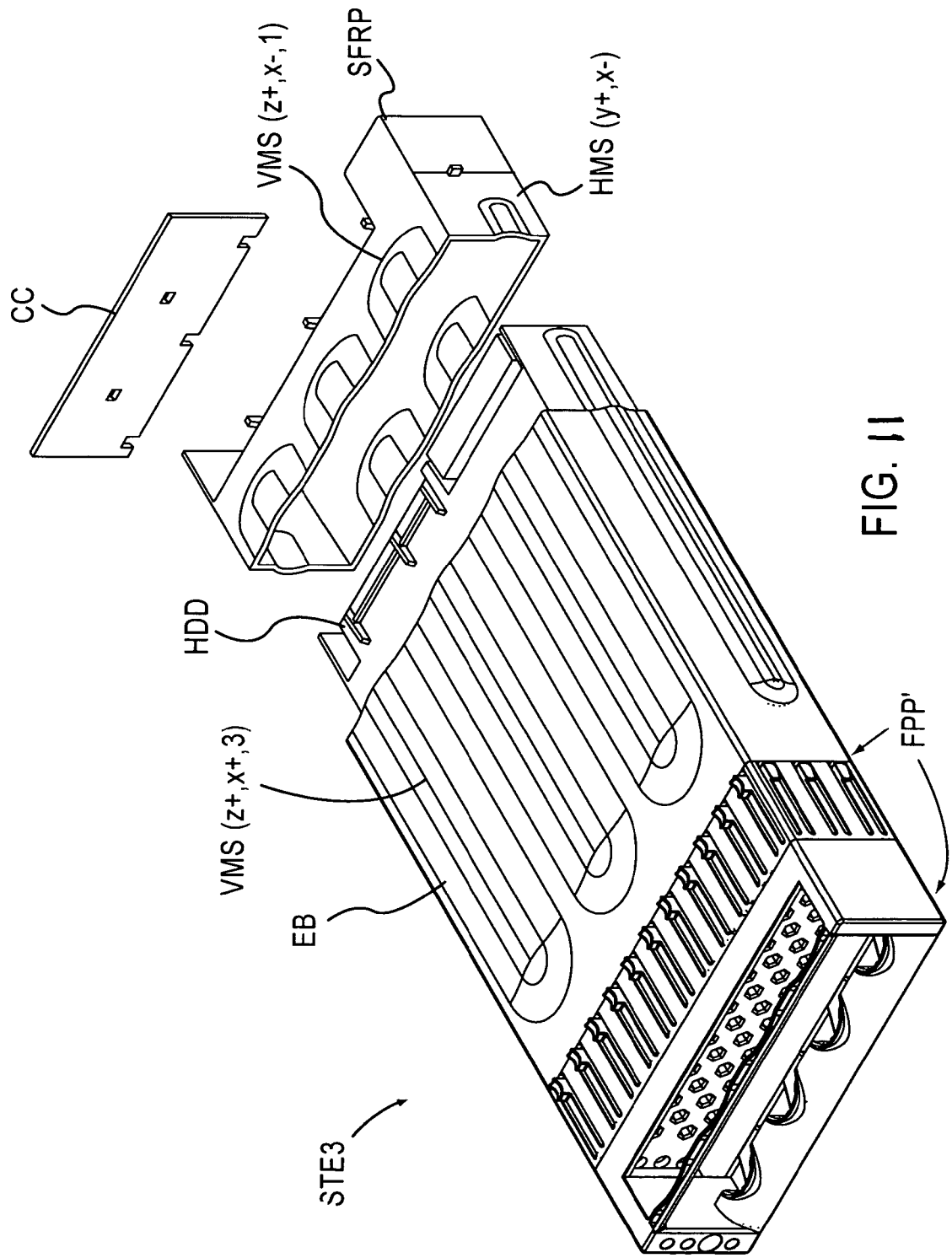
FIG. 11 illustrates the components of the hard drive as they may be manufactured in particular embodiments and snap fits.

FIG. 11 illustrates a sample assembly of an alternate embodiment of the hard drive enclosure STE3, in which the enclosure may be manufactured and/or assembled in one of several different ways. The front portion FPP' may be made in one injection molded part along with the enclosure body EB, in which double or triple shot polymers are used. Alternatively, the front portion FPP', the enclosure body EB and the rear portion RP are made by made of three separate parts that can be snap-fit together. Additionally, the conversion card CC is also snap fit into the rear portion RP. The conversion card CC is generally made separately so that it can be made compatible with the mid or back plane of the each storage system (See FIGS. 12A-D). The rear portion RP, even when it is manufactured separately and snap fit into the enclosure body, "completes" the membrane springs, both the vertical and horizontal compression members that are molded into the enclosure body EB, and further providing more stability across the second seam SM2 (as shown in FIG. 8a).

Figure 12A:
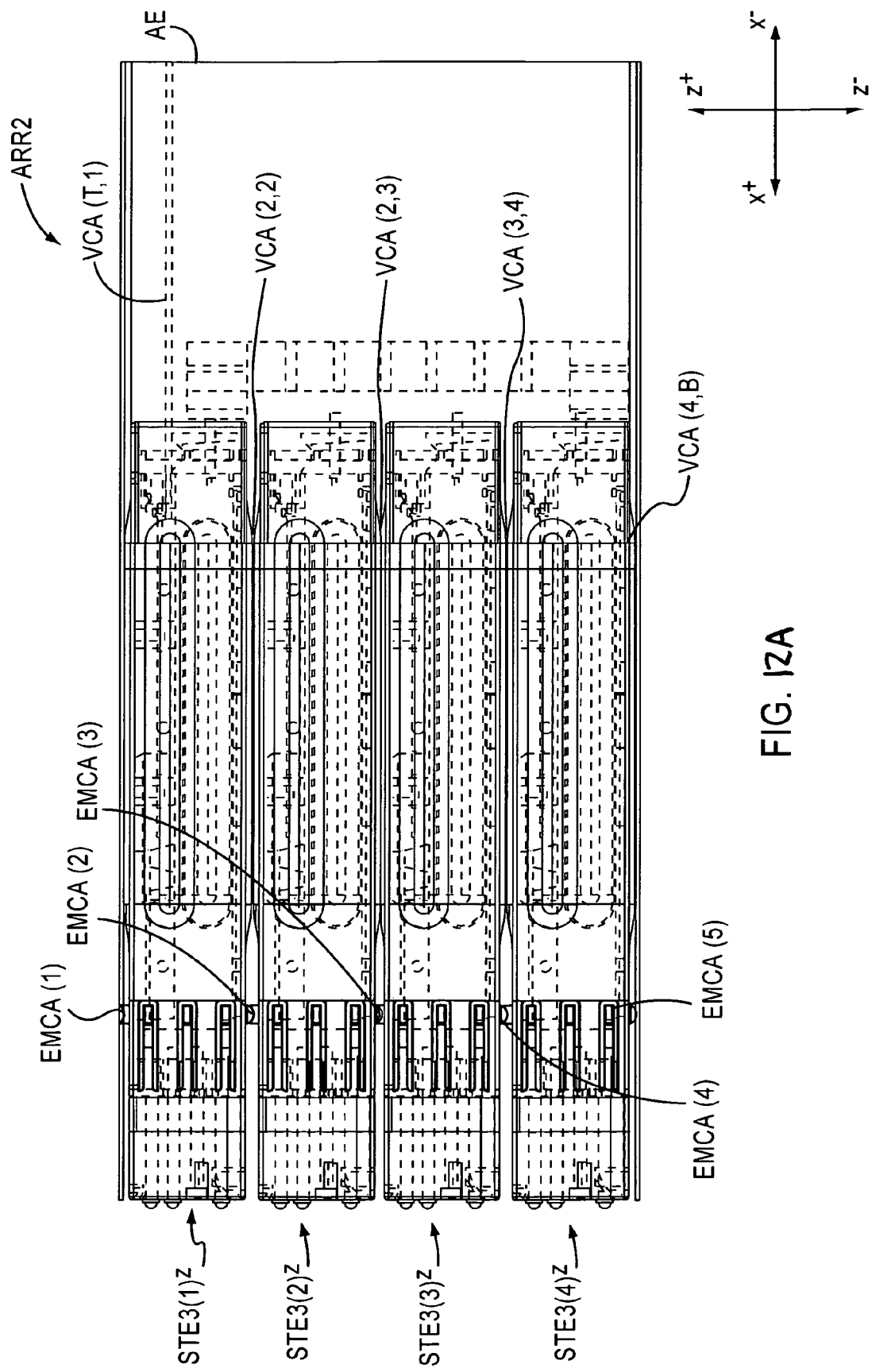
FIG. 12a illustrates an array of the alternate embodiment of the hard disk enclosures from a side view.

Referring now to FIGS. 12A-D, an array of hard drive enclosures (in the alternate embodiment) STE3 is shown in an array of hard disk drive storage ARR2. FIG. 12A illustrates four (sets of) enclosures STE3(z1) . . . STE3(z4) (only one set per vertical level is shown in FIG. 12A) stored vertically in the array ARR2. Also shown are 5 sets of vertical compression areas VCA(T,1), VCA(1,2), VCA(2,3), VCA(3,4) and VCA(4,B) that provide the pre-stressed vertical compression for dampening vibration, shock and acoustic noise (another form of vibration as well). The vertical compression areas VCA(T, 1) . . . VCA(4,B) are generally caused by the membrane springs on the top and bottom of the enclosure bodies of the respective enclosures. In the vertical compression areas VCA (1,2), VCA(2,3) and VCA(3,4), the compression provided is the membrane spring pressing against the "bottom" of the above enclosure. In the vertical compression areas VCA(T,1) and VCA(4,B), the vertical compression is caused by the membrane springs being compressed against the top and bottom of the array enclosure AE, respectively. Further, the optional electromagnetic contact areas are shown as EMCA (1) . . . EMCA(5), in which the optional tab structures on the respective front plates of the front portions are in contact with one another. As discussed above, and in U.S. Pat. No. 7,064, 265, which is incorporated by reference. The tabs have a waveguide effect, and are usually formed in a bathtub-like structure, and when placed into an array ARR2, the tabs are in contact with one another creating EMI waveguides.

Figure 12B:
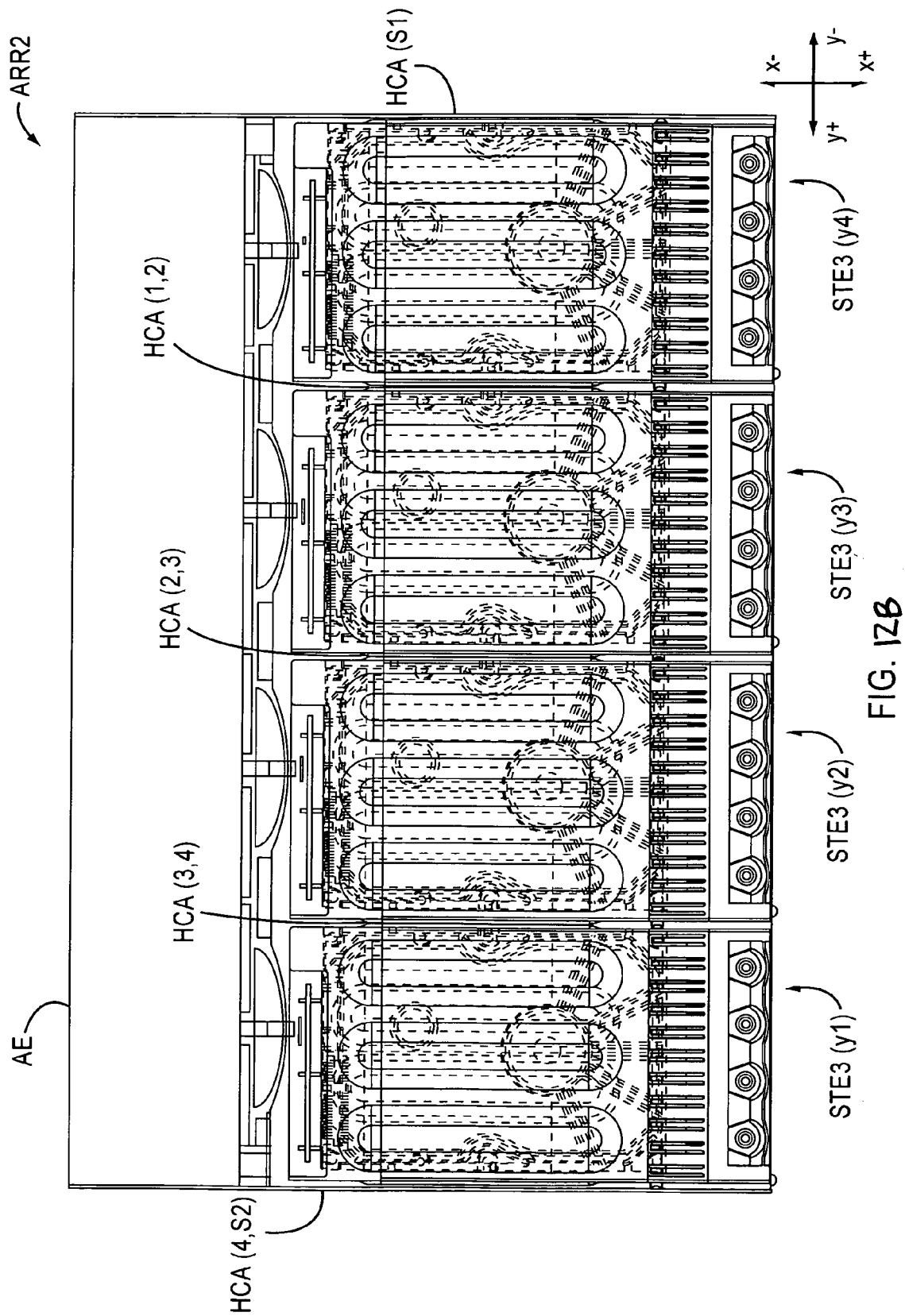
FIG. 12b illustrates an array of the alternate embodiment of the hard disk enclosures from a top view.

Referring to FIG. 12B, a top view of the array of hard drive enclosures ARR2 along the y axis STE3(y1) . . . STE3(y4). Similar to FIG. 12A, the top view shows the horizontal compression areas, HCA(S1,1) . . . HCA (4, S2), the provide the enclosures with the compression (from pre-stress polymer members) to provide the vibration, shock and acoustical dampening needed for hard-drives, while eliminating "sinusoidal creep" through the use of variable-load membrane springs.

Figure 12C:
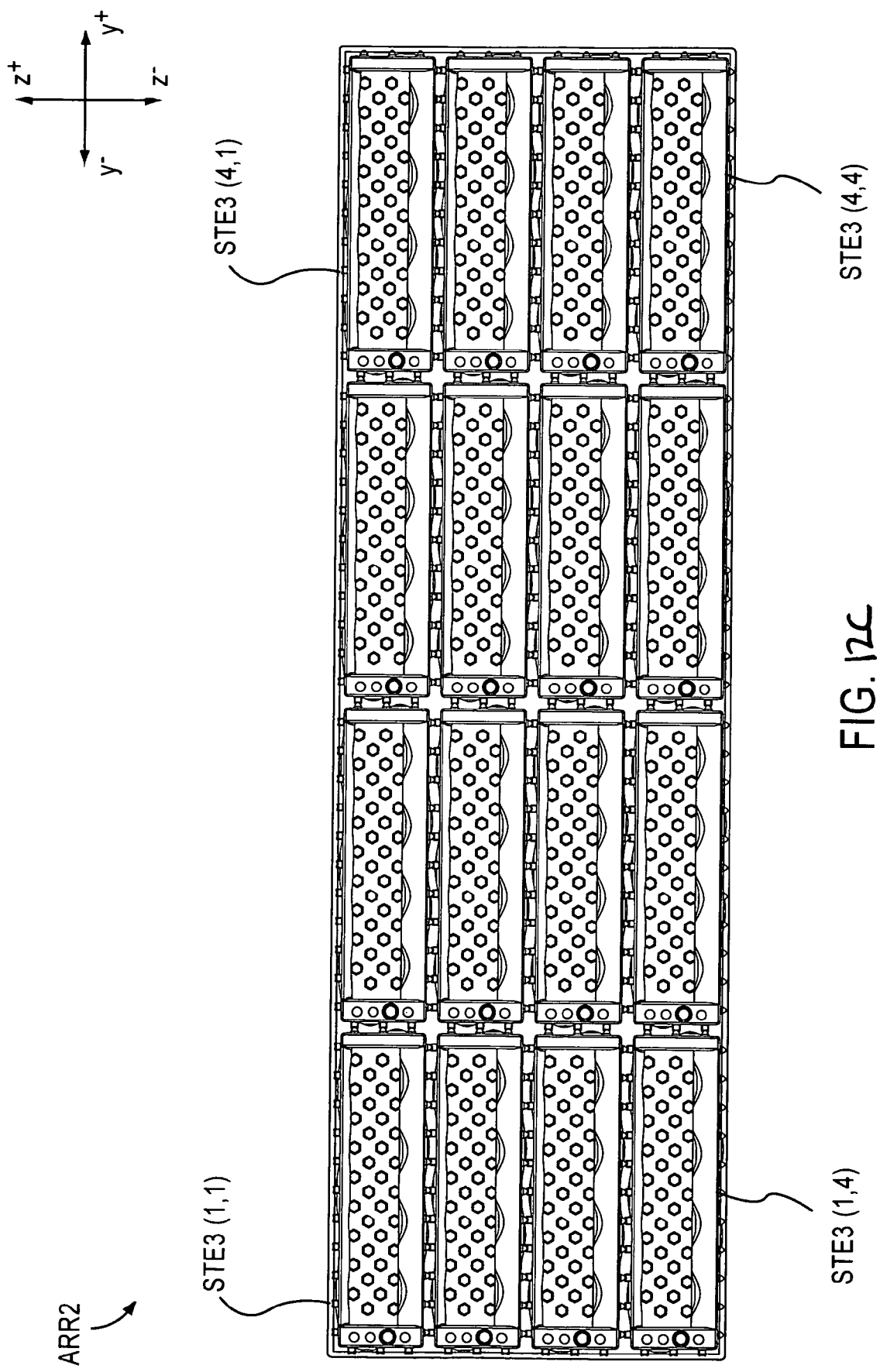
FIG. 12c illustrates an array of the alternate embodiment of the hard disk enclosures from a front view.
Figure 12D:
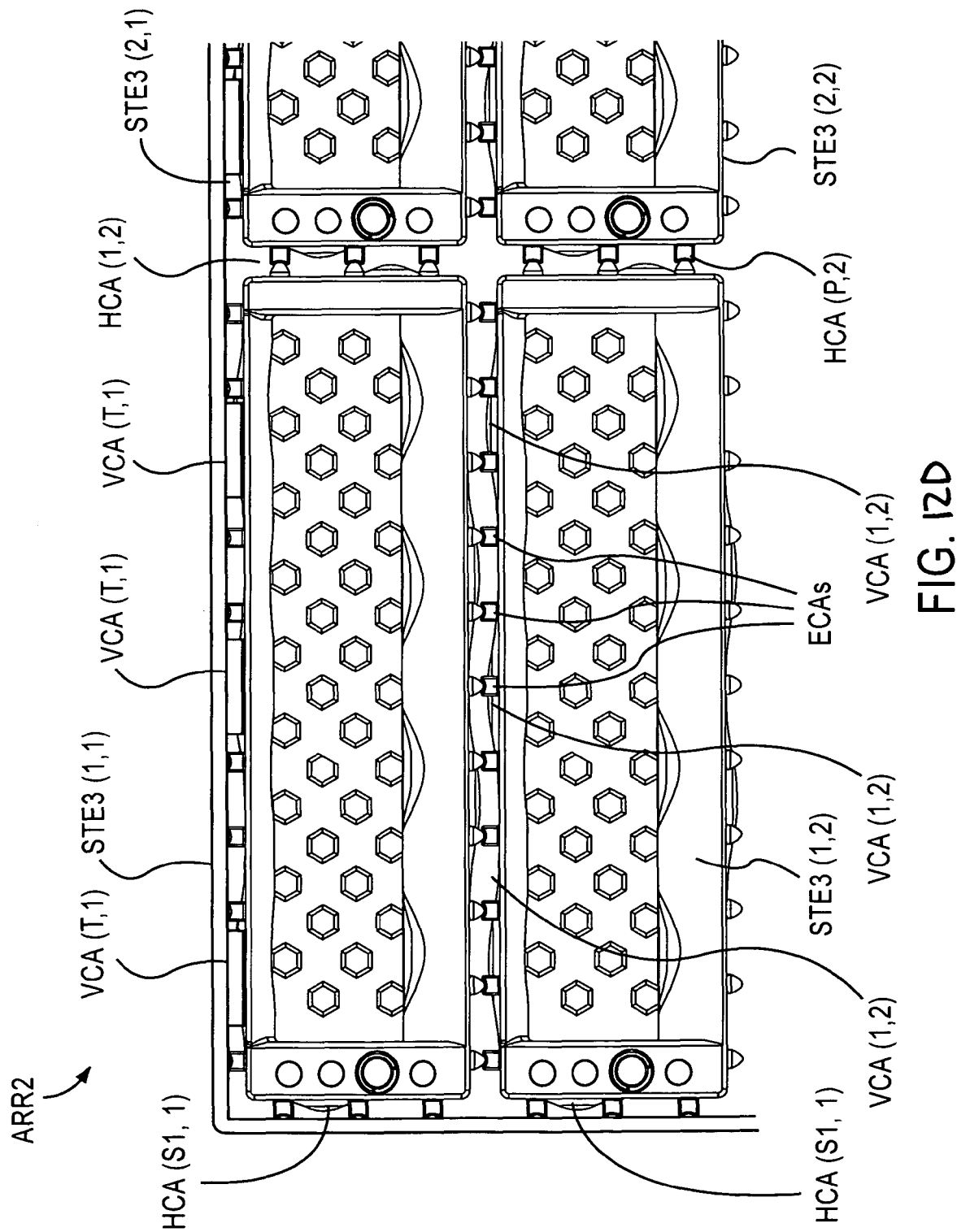
FIG. 12d illustrates the detail of the contact points (compression) in an array of the hard disk enclosures depicted 8a-10b.

FIGS. 12C and 12D provide a front-view overview of a 4.times.4 array of hard drive enclosures ARR2. FIG. 12D provides a detail of the front view connection between the alternate hard drive enclosures STE3. The vertical and horizontal compression areas between the four alternate hard drive enclosures are shown.

The table below provides information of examples of polymers that might be employed for various embodiments of the Hard Drive Haven™, and its progeny, including the retro-fit embodiment as well, in which the relevant technical details are incorporated by reference. The table demonstrates the properties that are required to deliver the performance necessary for the life of the systems in which the HDH™ will be employed. Data sheets of polymers that may be applicable to this invention, which are hereby incorporated by reference, include some of the materials described below.

TABLE-US-00001 TABLE A Materials for use in the various embodiments of the hard drive enclosures and/or storage systems. Notes and technical Material/Manufacturer/materials, incorporated Tradename Distrib. by reference Delrin Dupont Hytrel Dupont Thermoplastic and elastomer Zytel Dupont Glass-reinforced Noryl GE Website (www.ge.com) Ultem GE "Valox GE" Premiere Parker-Incorporated by reference. Chomerics EMI Hannefin Used for faceplate and possibly for the springs and provides EMI shielding in certain embodiments. See U.S. patent application Ser. No. 11/012,896 which is incorporated by reference. Capron BASF While the invention has been shown or described in only some of its forms, it should be apparent to those skilled in the art that it is not so limited, but is susceptible to various changes without departing from the scope of the invention. For example, the dampening materials may be formed from a thin film, sheet, molded sheet/film or a combination thereof, and may be placed at a variety of interfaces to further reduce vibration and shock.

I claim:

1. An enclosure for a hard disk drive, comprising:
a front portion made of one or more polymers; said front portion including five sides and an open end, wherein a front wall of said front portion includes ventilation structures, each of said ventilation structures having a body that extends into the interior of said front portion;
a body portion; said body portion made of a polymer and said body portion having five sides extending from an open side of said body portion, and including an interior space accessible from said open side being for storage of a hard disk drive; said body portion configured such that a first pair of opposite sides in said body portion include a set of horizontal pre-stressed polymer springs formed integrally into the first pair of opposite sides and extending outward from said body portion, and a set of pre-stressed vertical polymer compression members extending upward from a second pair of opposite sides, said vertical compression members formed integrally into the second pair of opposite sides providing compression in a direction perpendicular to said horizontal pre-stressed polymer springs, when said pre-stressed vertical polymer compression members contact a horizontal structure.

2. The enclosure as recited in claim 1, wherein said horizontal pre-stressed polymer springs are membrane springs having variable thickness.

3. The enclosure as recited in claim 2, further including a set of conductive tab structures configured around a rear portion of four sides of said front portion, said conductive tab structure having a body extending outward from said sides of said front portion, a top of said conductive tab structure body formed into an arcuate shape, said conductive tab structure forming electromagnetic contact areas when said conductive tab structures are in contact with adjacent enclosures.

4. The enclosure as recited in claim 1, wherein said front portion is at least partially made of an electromagnetic interference (EMI) shielding polymer, said EMI-shielding polymer including both coated and filled polymers.

5. The enclosure as recited in claim 1, wherein there are a multiple of said enclosures, and said enclosures are stored on a set of two opposite vertically-placed shelves, said vertically-placed shelves including a set of shelving structures extending inward from said vertically-placed shelves, and designed to contact a exterior of said pre-stressed vertical polymer compression members, and said shelving structures separate said body portions, when said enclosures are placed in between said two vertically-placed shelves.

6. A hard disk drive enclosure, comprising:
a front portion, said front portion made of at least one polymer, and having five sides, including a set of ventilation structures formed into a front side of said front portion, each of said ventilation structures having a body that extends into an interior of the front portion providing volumetric access to the interior of said front portion;
a body made of polymer, said body including four exterior faces and a hollow interior, wherein said body has a set of membrane springs formed into four said exterior faces of said body;
said body connected to said front portion, such that said hollow portion of said body is volumetrically connected to said open side of said front portion.

7. The enclosure as recited in claim 6, wherein said membrane springs have variable thickness.

8. The enclosure as recited in claim 6, wherein said body is formed from a separable front part and rear part, and said membrane springs are continuously formed when said front and rear parts are fit together.

9. The enclosure as recited in claim 6, wherein said front portion includes a cover portion and a front plate portion, said cover portion made from a non-conductive polymer, and said front plate portion made from a conductive polymer, capable of providing electromagnetic interference (EMI) shielding, wherein said conductive polymer includes a coated or filled polymer.

* * * * *